United States Patent [19]
Saulpaugh et al.

[11] Patent Number: 5,630,076
[45] Date of Patent: May 13, 1997

[54] DYNAMIC DEVICE MATCHING USING DRIVER CANDIDATE LISTS

[75] Inventors: Thomas E. Saulpaugh, San Jose; Holly Knight, La Honda; Jano Banks, San Jose; Ron Hochsprung, Los Gatos, all of Calif.

[73] Assignee: Apple Computer, Inc., Cupertino, Calif.

[21] Appl. No.: 435,676

[22] Filed: May 5, 1995

[51] Int. Cl.$^6$ .................................................. G06F 13/00
[52] U.S. Cl. ..................... 395/284; 395/830; 395/651; 395/681
[58] Field of Search ................................ 395/284, 500, 395/650, 700, 828, 830, 831, 832, 834

[56] References Cited

U.S. PATENT DOCUMENTS

| | | | |
|---|---|---|---|
| 4,974,151 | 11/1990 | Advani et al. | 395/828 |
| 5,014,193 | 5/1991 | Garner et al. | 395/830 |
| 5,317,695 | 5/1994 | Celi, Jr. | 395/830 X |
| 5,319,751 | 6/1994 | Garney | 395/650 |
| 5,339,432 | 8/1994 | Crick | 395/700 |
| 5,418,960 | 5/1995 | Munroe | 395/700 |
| 5,432,941 | 7/1995 | Crick et al. | 395/700 |

*Primary Examiner*—Glenn A. Auve
*Attorney, Agent, or Firm*—Blakely, Sokoloff, Taylor & Zafman

[57] ABSTRACT

A method and mechanism for automatically correlating a device to its appropriate driver within a computer system utilizing candidate matching. A device tree indicating devices coupled to a computer system is available from an operating system. Within the device tree are device nodes which specify a particular device's name (device name) and a property which indicates compatible device names (compatible names) to the particular device. Drivers for devices can be located in RAM, ROM, or in another storage media (such as disk drive). Drivers can include a data field indicating a driver name indicative of a corresponding device with which they operate. For a particular device, the system constructs a candidate list of drivers by comparing (1) the device name and (2) the compatible names from the device tree against all the driver names of data fields of all known drivers. The candidate list is sorted so that matches by device name and proper version number are higher priority. The system then sequentially attempts installation of the drivers from the candidate list to the particular device (based on priority order) to determine the appropriate driver (e.g., probing the device using diagnostic operations). Drivers are skipped that cause an error or that do not properly configure the device. The process can be repeated for all devices in the computer system. The process is dynamic in that it is operable on boot up and upon any system change that allows more drives to be recognized.

23 Claims, 11 Drawing Sheets

DYNAMIC DEVICE MATCHING USING DRIVER CANDIDATE LISTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright Apple Computer, Inc.

BACKGROUND OF THE INVENTION

1. Field of the Invention

The present invention relates to the field of device operability with regard to devices of a computer system. More specifically, the present invention relates to the field of device and driver compatibility within a computer system for device configuration.

2. Prior Art

Computer systems are composed of a variety of different components or "devices" that operate together to form the resultant system. Typically, some of the devices are supplied with the computer system initially, such as a central processing unit and a communication bus, and some devices can be installed into the computer system after the initial configuration of the system. In any event, in the general case, each device has an associated driver that, among other functions, configures the device and allows the device to be operable within the overall system. Drivers are typically software instructions that can be loaded into the computer system's memory and when executed will communicate with the device to properly configure the device for operation. The driver may initialize the device so that the device can function and the driver may also allow the device to communicate normally within the overall system. Since installed devices can be altered and since new devices can be inserted into a configured computer system, it becomes important to match the proper driver to the proper device for reliable operation of the computer system.

In the past, devices were matched with their proper driver by strict one to one correspondence that was typically manually performed by the computer system user. That is to say, the computer system user would alter the contents of a system file that was read at computer "boot" and this system file would contain a list of drivers that the computer system recognized and would associate a particular driver to a particular device according to an inflexible listing. The driver first needed to be loaded into the computer system before the system file was updated by the computer user so that the system would recognize the driver. This system is referred to herein as "hard coding" the drivers to their associated devices. While workable in some respects for knowledgeable computer users, this system is undesirable for computer users that do not have the know how to perform the proper matching between a given device and its driver or for those that do not know the location of the proper driver. It would be desirable, then, to provide a mechanism and method for reducing problems associated with configuring the proper driver with its associated device in a computer system. The present invention provides such advantageous solution.

In a particular systems, a PCI (Peripheral Component Interconnect) standard is adopted wherein a device driver name can be associated with a device. This name can be placed inside the device's memory. However, the PCI standard does not require that each device provide a name for the its associated driver. Therefore, there is not a guaranteed one to one correspondence between a device name and its associated driver for all system devices. If a driver does not provide its own driver name, then the system constructs a pseudo name using the device vender information and also the device type. However, this vender information and device type might correspond to more than one device. In such case, a driver might correspond to more than one device but will only operate with one device. This unfortunate case increases the difficulty in properly assigning a device to its driver. What is needed is a mechanism and method that overcomes the above problem. The present invention provides such solution.

Accordingly, it is an object of the present invention to provide a mechanism and method for efficiently and effectively correlating a computer system device with its proper device driver. It is an object of the present invention to provide the above with an automatic procedure that determines an appropriate driver, from among a set of drivers, for a particular device of a computer system. It is also an object of the present invention to perform the above for all devices of the computer system. It is yet another object of the present invention to utilize the above to facilitate computer users in configuring computer systems after a modification thereof that might involve adding or altering a computer system device which would then require a device driver update. These and other objects of the present invention will become clear within discussions of the present invention presented herein.

SUMMARY OF THE INVENTION

A method and mechanism are described for automatically correlating a device to its appropriate driver within a computer system utilizing candidate matching. A device tree indicating devices coupled to a computer system is available from an operating system. Within the device tree are device nodes which specify a particular device's name (device name) and a property which indicates compatible device names (compatible names) to the particular device. Drivers for devices can be located in RAM, ROM, or in another storage media (such as disk drive). Drivers can include a data field indicating a driver name indicative of a corresponding device with which they operate. For a particular device, the system constructs a candidate list of drivers by comparing (1) the device name and (2) the compatible names from the device tree against all the driver names of data fields of all known drivers. The candidate list is sorted so that matches by device name and proper version number are higher priority. The system then sequentially attempts installation of the drivers from the candidate list to the particular device (based on priority order) to determine the appropriate driver (e.g., probing the device using diagnostic operations). Drivers are skipped that cause an error or that do not properly configure the device. The process can be repeated for all devices in the computer system. The process is dynamic in that it is operable on boot up and upon any system change that allows more drivers to be recognized by the computer system.

Specifically embodiments of the present invention include, in a computer system having a processor coupled to a communication bus, a memory unit coupled to the communication bus, and devices coupled to the communication bus, a method for configuring a particular device of the devices, the method comprising the computer implemented steps of: reporting a set of device names associated with the particular device; scanning a first set of available drivers within the computer system to determine a second set of drivers individually having a driver name that matches with any name of the set of device names (including a compatible device name); sorting the second set of drivers by a priority of compatibility with the particular device; sequentially attempting installation of individual drivers of the second set of drivers with the particular device to determine a first matching driver of the second set of drivers that properly configures the particular device; and installing the first matching driver with the particular device upon an indication by the step of sequentially attempting installation. Embodiments of the present invention include the above and wherein the a set of device names associated with the particular device comprises a device name of the particular device and a set of compatible device names indicating devices compatible with the particular device.

Embodiments of the present invention include the above and wherein the step of sorting the second set of drivers by a priority of compatibility with the particular device comprises the computer implemented steps of: sorting the second set of drivers such that an individual driver matching with the device name is given higher priority over an individual driver matching with a compatible device name of the set of compatible device names; and sorting the second set of drivers according to driver version information. Embodiments of the present invention include the above and wherein the step of sequentially attempting installation comprises the computer implemented steps of: probing the particular device with a particular driver of the second set of drivers; performing a diagnostic test with respect to the particular driver and the particular device; and reporting a status indicating whether or not the particular driver and the particular device are compatible.

Embodiments of the present invention include the above and further comprising the computer implemented steps of: scanning a third set of available drivers within the computer system to determine a fourth set of drivers having a driver name that matches with either the device name or any name of the set of compatible names, the forth set larger than the second set; and sorting the forth set of drivers by a priority of compatibility with the particular device; sequentially attempting installation of individual drivers of the forth set of drivers with the particular device to determine a second matching driver of the forth set of drivers that properly configures the particular device, the second matching driver being more compatible with the device over the first matching driver; removing the first matching driver from the particular device; and installing the second matching driver with the particular device.

Embodiments of the present invention also include a computer system implemented in accordance with the above.

DETAILED DESCRIPTION OF THE INVENTION

The present invention includes an apparatus and method for automatically determining a driver for a particular device coupled within a computer system. In the following detailed description of the present invention numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. Some portions of the detailed descriptions which follow are presented in terms of procedures and symbolic representations of operations on data bits within a computer memory. These procedure descriptions and representations are the means used by those skilled in the data processing arts to most effectively convey the substance of their work to others skilled in the art. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., see FIG. 1), or similar electronic computing device, that manipulates and transforms data represented as physical (electronic) quantifies within the computer system's registers and memories into other data similarly represented as physical quantities within the computer system memories or registers or other such information storage, transmission or display devices.

I. Computer System

Figure 1:
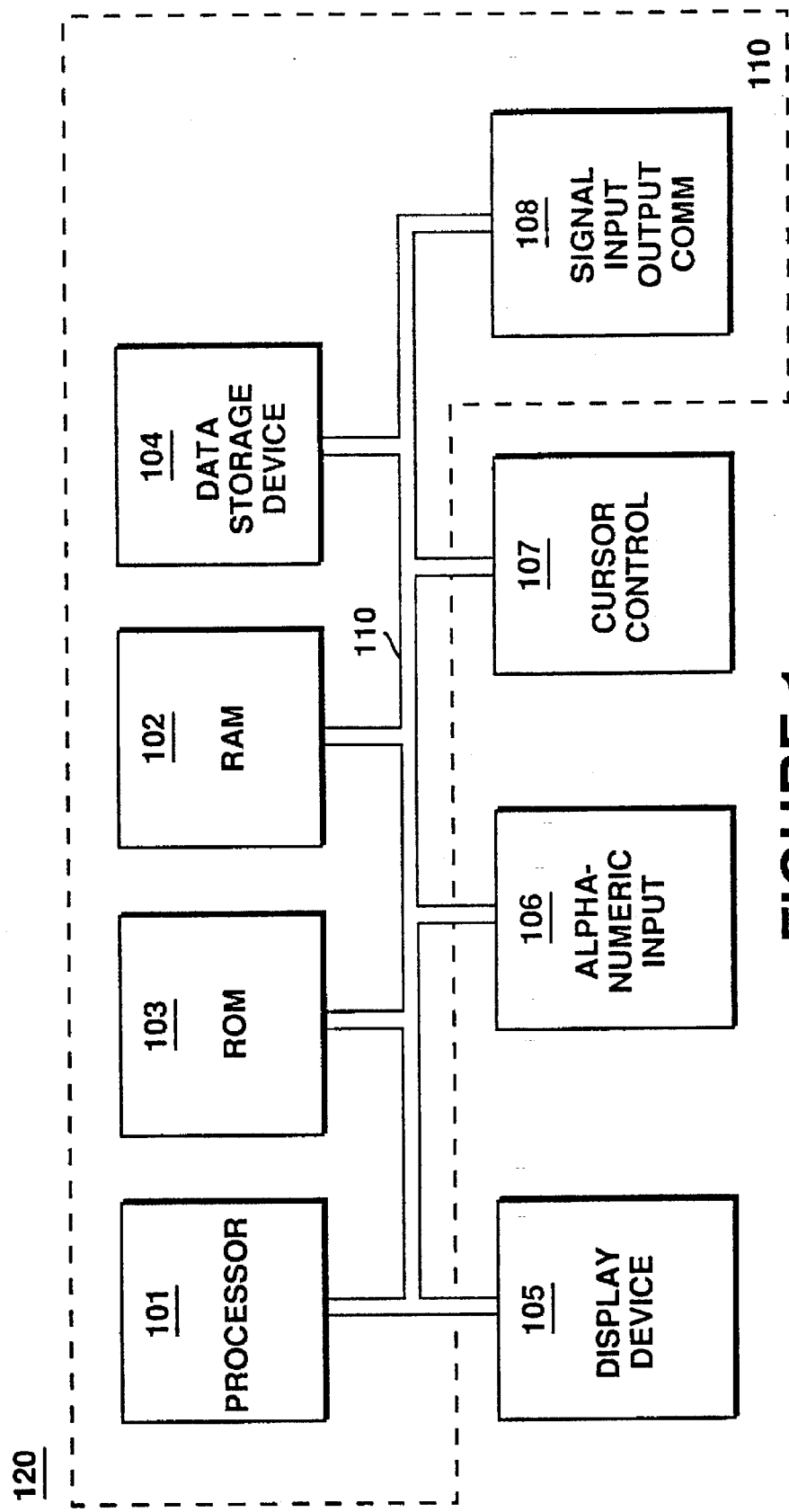
FIG. 1 is a block diagram illustration of a computer system used by embodiments of the present invention.

Procedures of the present invention to be described to follow operate within the environment of a computer system 120 as shown with reference to FIG. 1. An exemplary computer system is of the Macintosh line by Apple Computer, Inc. of Cupertino, Calif., however any number of other commercially available computer systems can effectively operate the procedures of the present invention and therefore come within the scope of the present invention. Generally, the computer system 120 comprises a bus 100 for communicating information, a central processor (CPU) 101 coupled with the bus for processing information and command instructions, a random access memory (RAM) 102 coupled with the bus 100 for storing information and instructions for the central processor 101, a read only memory (ROM) 103 coupled with the bus 100 for storing static information and command instructions for the processor 101, a data storage device 104 such as a magnetic disk or optical and disk drive coupled with the bus 100 for storing information and command instructions, and a display device 105 coupled to the bus 100 for displaying information to the computer user. A portion of the ROM 103 contains "firmware" utilized by the computer system for performing certain system tasks. The computer system's operating system software 30 (FIG. 3) can reside in the RAM 102, in the ROM 103 or within both. Portions of the operating system 30 can also reside in other data storage mediums such as the data storage device 104.

There is also an alphanumeric input device 106 in the system 120 in FIG. 1 including alphanumeric and function keys coupled to the bus 100 for communicating information and command selections to the central processor 101, a cursor control device 107 coupled to the bus for communicating user input information and command selections to the central processor 101 based on hand movement, and an input and output device 108 coupled to the bus 100 for communicating information to and from the computer system 120. The signal generation device 108 includes, as an input device, a high speed communication port configured to receive and transmit information.

The display device 105 utilized with the computer system 120 of the present invention may be a liquid crystal device, cathode ray tube, or other display device suitable for creating graphic images and alphanumeric characters recognizable to the user. The cursor control device 107 allows the computer user to dynamically signal the two dimensional movement of a visible symbol or cursor on a display screen of the display device 105. Many implementations of the cursor control device are known in the art including a trackball, mouse, joystick or special keys on the alphanumeric input device 105 capable of signaling movement of a given direction or manner of displacement. It is appreciated that the computer chassis 110 may include the following components of the present invention: the processor 101, the ROM 103, the RAM 102, the data storage device 104, and the signal input and output communication device 108 and optionally a hard copy printing device.

II. Device Tree Database

Figure 2:
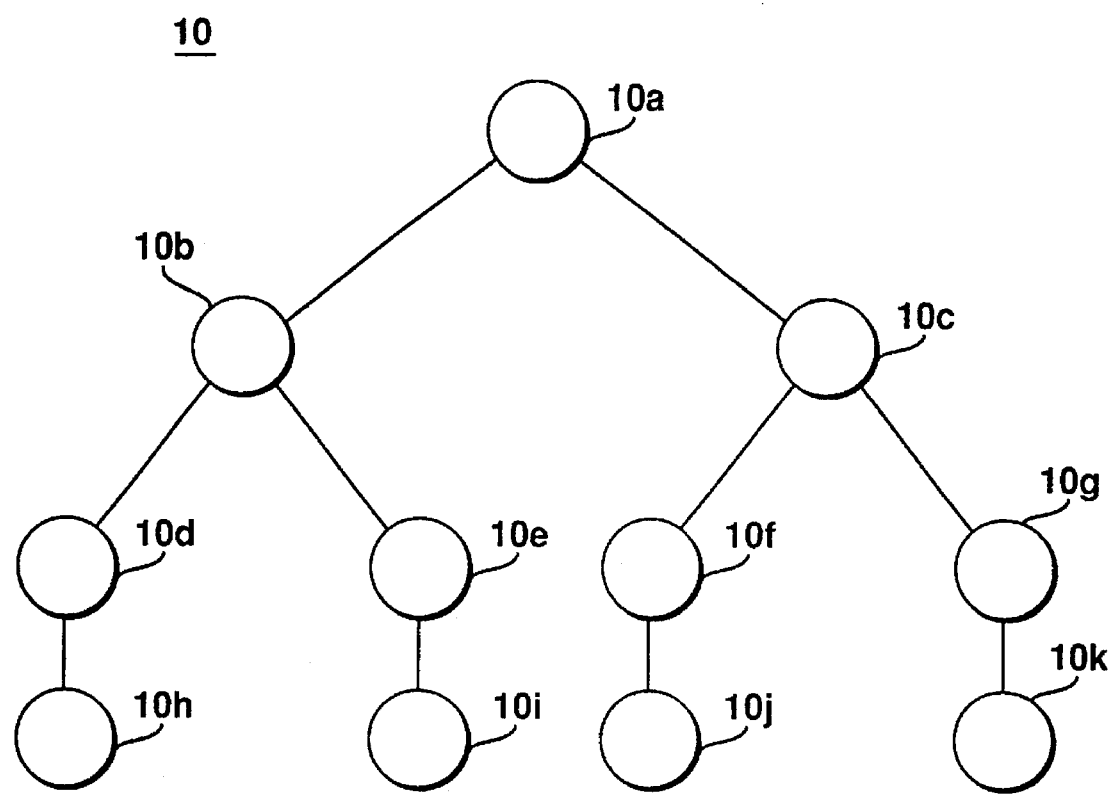
FIG. 2 is an illustration of a device tree database of I/O devices and communication buses used by the present invention.

FIG. 2 illustrates a logical representation of a simplified and exemplary device tree 10 database recognized by the present invention. This device tree 10 is a database stored in computer memory as is a hierarchical tree composed of device nodes such as noes 10a–10k. This device tree 10 is constructed during the initialization of the operation system 30 (e.g., during "boot") and may be altered thereafter. A number of different procedures can be used within the present invention to generate a listing of devices coupled within the computer system 120. One such procedure is the IEEE P.1275 firmware procedure that is used by one embodiment of the present invention. The device tree 10 database begins as a single root node 10a that represents the CPU's memory bus. All I/O buses and attached devices are assumed to descend from this single root or "node" 10a. Layers descending the device tree 10 database are dependent on the operation of devices associated with nodes above them. Buses are parent nodes and devices for the leaf nodes of the device tree 10. A complete device tree 10 represents the device topology of the computer system 20. A bus node in the device tree represents an I/O address space. Each device on a bus operates within the address space supported by its parent bus. Buses also contain information regarding interrupts, so that a device can request service from a driver.

It is appreciated that drivers of the present invention are matched to devices, but not to buses. In the device tree 10, buses can lead to other buses. A node of the device tree 10 that corresponds to a device is called a "device node." Devices added to the computer system 120 will be added to the device tree 10 upon initialization of the computer system 120. Devices can contain drives, such as the disk drive 104 can store drives in a device driver folder.

The present invention used information described above in a Name registry which is essentially a copy of pertinent information obtained from the device tree 10 database. Therefore, discussions herein refer to the name registry 10 and the device tree 10 synonymously.

Figure 3:
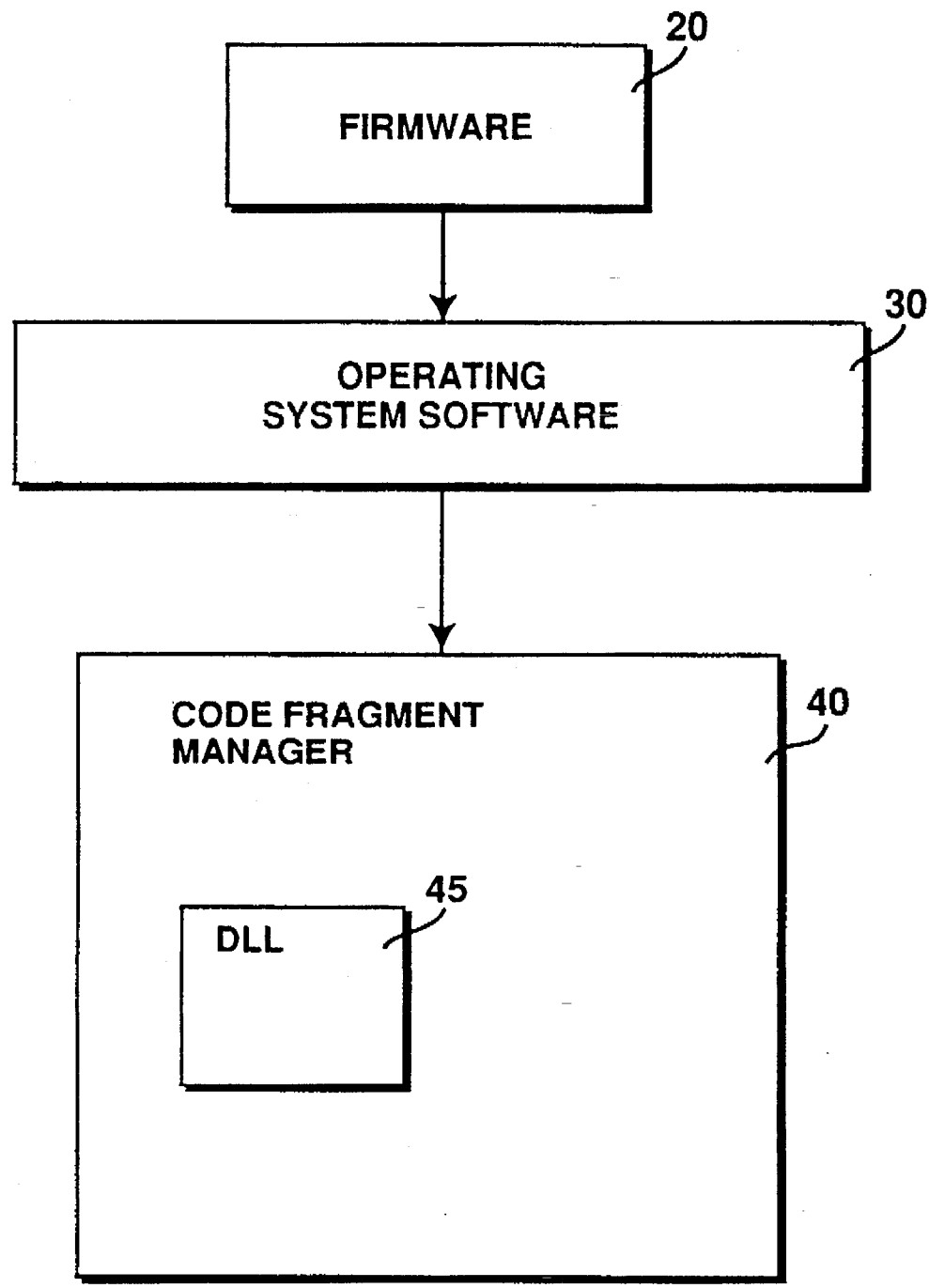
FIG. 3 illustrates a relationship between the present invention Driver Loader Library (DLL), the Code Fragment Manager (CFM), the computer system's operating system and the computer system firmware.

Refer to FIG. 2 and FIG. 3. An exemplary device tree 10 that can be used by the present invention is generated by firmware 20 upon the initialization of the computer system 120. While a portion of the information contained in the device tree 10 is utilized by the present invention, the actual (complete) copy of the device tree 10 as generated by the firmware need to be used. At system initialization, devices communicate their presence to firmware 20 which cooperates with the operating system 30 to construct the device tree 10. Information of the device tree 10 used by the present invention can be constructed under the IEEE P.1275 Standard which is well known in the an and is not described herein. The device tree 10 database can be modified by the computer system's operating system 30 from time to time as required or instructed. As will be described further below, procedures of the present invention within a driver loader library (DLL) 45 operate within the environment of a Code Fragment Manager 40 (CFM). The CFM 40 used by the present invention is described in more detail in a publication entitled Inside the Macintosh "PowerPC System Software," by Apple Computer, Inc., published by Addison-Wesley Publishing Company, February 1994, see specifically chapter three. One of ordinary skill in the art would understand the relationship between the firmware 20, the operating system software 30, and the CFM 40 as described in the above cited reference. An embodiment of the present invention utilizes this relationship shown in FIG. 3.

Figure 4:
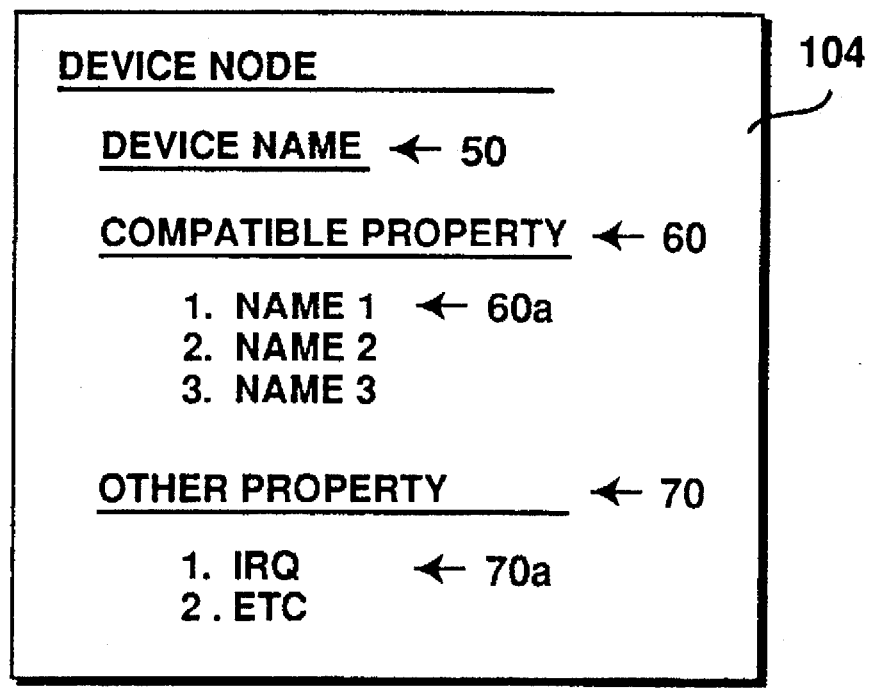
FIG. 4 illustrates information contained in a particular device node of the device tree.

With reference to FIG. 4, each device node 10a–10k of the device tree 10 database is presented to the operating system 30 and drivers by associated descriptive pieces of data called properties that are within each node. A representative device node 10f is illustrated. All device nodes of the device tree 10 database have a property that indicates the name 50 of the particular device (e.g., device name). FIG. 4 illustrates the name property as "Device Name" 50. It is this name 50 property that form a primary basis for matching a driver to a device under embodiments of the present invention. In an exemplary embodiment of the present invention, a name property 50 consists of a null-terminated suing of characters. Device nodes may also contain a property that indicates compatible devices 60a to device name 50. FIG. 4 illustrates this property as "Compatible Property" 60 which provides a listing 60a of compatible names (e.g., name1, name2, and name3) of devices that are compatible with the "device name" 50. These names 60a represent devices that are compatible with the device indicated by the device name 50. These compatible names 60a are also used by the present invention to match drivers with devices should no driver match to a device name 50 for a particular device node 10f. Device nodes 10f can also contain other properties, for instance "Other Property" 70 includes information regarding interrupts (IRQ) 70a associated with the device indicated by the "device name" 50 as stored in the node 10f.

In the discussion to follow, device driver 80 or "native device drivers" will be discussed first followed by a discussion of the Driver Loader Library (DLL) of the present invention. In both instances, the drivers 80 and the DLL 45 of the present invention are discussed and following, for each, is a particular, exemplary, implementation of one embodiment of the present invention within an exemplary environment. It is appreciated that the present invention may operate on a variety of environments within a variety of different hardware and software platforms and to this extent, the disclosed particular embodiment should not be construed as limiting the scope present invention to any particular environment or platform.

III. Native Device Drivers

Under the present invention, native device drivers 80 (or just "drivers") are stored in several locations within the computer system 120. A driver 80 (FIG. 5) can be located in RAM 102, ROM 103 (e.g., within expansion ROM located on the device itself), in a file system (e.g., on a disk drive 104), or may be directly located within a device node 10a–10k in the device tree 10 database. In the latter case device matching is not typically required for a device node having the driver associated therewith unless a more compatible driver is located elsewhere. For the majority of cases the device node does not have the driver associated with it in the device tree 10. The present invention automatically matches up a device of the device tree 10 with its appropriate driver. The drivers located in the device tree 10 are sometimes called default drivers and are said to exist within device driver property for the node. Drivers located in the file system 104 are referred to as drivers in a "device driver folder" and can override the default driver under the present invention by use of candidate list matching and candidate list priority sorting as described to follow.

Figure 5:
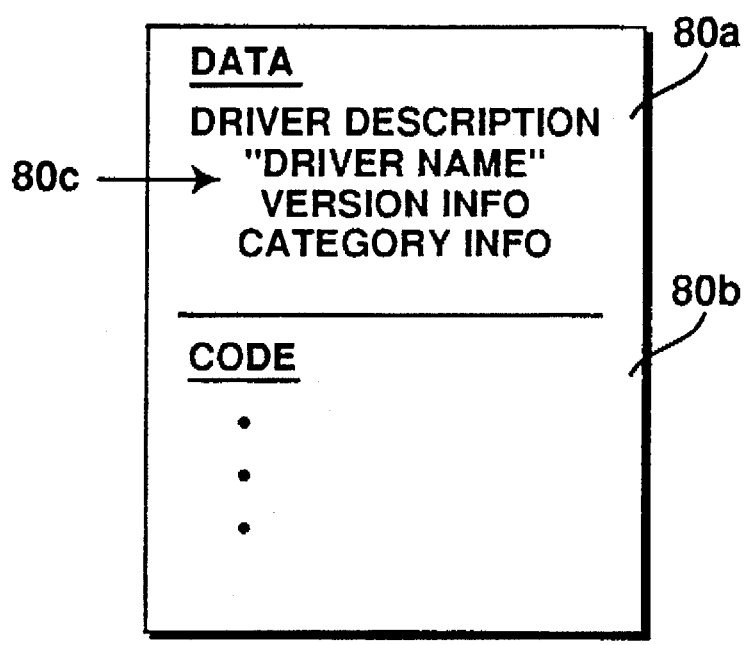
FIG. 5 is an illustration of pertinent sections of a typical device driver used by the present invention including data section structure.

Pertinent contents of an exemplary driver 80 are shown in FIG. 5. A driver 80 within the present invention contain two sections: (1) a data section 80a; and (2) a code section 80b. The data section 80a contains a driver description data structure which does contain a "driver name" 80c. This driver name 80c can be specific to a particular device or can contain a generic name applicable to a class or group of devices. Also contained within the driver description data structure are (1) version information regarding the version of the driver code 80b and also (2) category information indicating type of device for which the driver is to be used (e.g., disk driver, video card, etc.). The driver name 80c of the driver description data structure 80a can be a generic driver name (e.g., NDRV) in the event the driver is compatible with a number of different devices. Also included in the driver 80 is a code section 80b containing the instructions that are used to properly configure the associated device for integration within the computer system 120.

It is appreciated that in the event that a device 80 does not contain a device name 80c, the operating system 30 or firmware 20 will generate a pseudo name for the device that consists of (1) a vender indicator known by the driver and (2) the driver type indicating the use of the device used by the driver (e.g., video card, disk drive, etc.). During initialization of the computer system 120, devices not having device names generally communicate this pseudo name to the IEEE P.1275 procedure so the device tree 10 database will create a device node having the pseudo name. As will be described further below, the present invention provides candidate list matching procedures to account for the condition wherein more than one coupled device communicates the same pseudo name to the device tree 10 database and more than one driver in the system also contains this name.

Discussions to follow describe a format and implementation of a device drivers 80 as shown in FIG. 5 within the environment of a particular software system. It is to be appreciated that the present invention driver 80 can be implemented in a number of different environments and the implementation to follow is exemplary only and should not be construed as limiting of the scope of the present invention.

Native device drivers 80 (operable for example on the PowerPC platform) are Code Fragment Manager 40 (CFM) fragments with the following general features: (1) CFM container format; (2) CFM programing interfaces exported from the driver to Mac OS; and (3) CFM programming interfaces imported by the driver from an operating system, such as the Mac OS (Macintosh Operating System). Generic drivers are CFM fragments that work with the Device Manager 90 (FIG. 6) and the Driver Loader Library 45. The container format for native PowerPC device drivers 80 is the container format supported by the Code Fragment Manager 40 (FIG. 7). The CFM format provides all mechanisms necessary for drivers, is integrated with Mac OS, and is documented in a publication entitled Inside Macintosh: PowerPC System Software.

Native drivers, both genetic and family, export a data symbol that characterizes the driver's functionality and origin. A family is a collection of devices that provide the same kind of functionality. A family can also be "genetic." This symbol, called TheDriverDescription 80a, is exported through the CFM's symbol mechanism. Driver Description information helps match drivers with devices. It also lets the Device Manager 90 pick the best driver among multiple candidates. For example, it lets a newer driver on disk override a ROM-based driver. Native generic drivers 80 export a single code entry point, called DoDriverIO, that handles all Device Manager 90 operations. It is a selector-based entry point with command codes that specify the I/O action to be performed. The device driver can determine the nature of the I/O request from the command code (Initialize, Finalize, Open, Close, Read, Write, Control, Status, KillIO, Replace, or Superseded) and command kind (Synchronous, Asynchronous, or Immediate). The CFM 40 requires that fragment imports be identified in some manner. With generic drivers, this is done by linking the device driver fragment code to the Driver Services Library. The linking lets the fragment's symbols be bound at execution time. The Driver Services Library should be used instead of a Toolbox-based library when linking a device driver.

Native device drivers 80 can use the CFM's import library mechanism to share code or data. With this technique, the CFM 40 creates an import library fragment when the first driver is loaded. When another driver is loaded, it establishes a connection to the existing library, letting the two drivers share code or data.

The Device Manager 90 is part of a system software 30 that provides communication between applications and devices. The Device Manager 90 calls generic device drivers and it does not manipulate devices directly. Generic drivers accept calls from the Device Manager 90 and either cause device actions or respond by sending back data generated by devices. For further general information about drivers and the Device Manager 90, see Inside Macintosh: Devices, by Apple Computer, Inc. The Device Manager 90 has traditionally been the gateway for device drivers to use the Macintosh Toolbox, for example.

The following discussion differentiates, in one embodiment, the native driver 80 of the present invention to a genetic driver known in the Macintosh environment. In one embodiment, a native driver 80 receives its parameters through the single DoDriverIO entry point, subject to the calling conventions specified by the PowerPC runtime architecture, in one embodiment. If a DoDriverIO procedure is written in C (for example), the correct behavior is guaranteed. A native driver does not have access to its Driver Control Entry (DCE) in the Unit Table. ImmediateIOCommandKind is passed in the ioKind parameter to specify that a request must be executed immediately. If so, the driver must process the request completely and the result of the process must be reflected in the return value from the driver. Initialize, Finalize, Open, Close, KillIO, Replace, and Superseded calls are always immediate. If the ioKind parameter is either SynchronousIOCommandKind or AsynchronousIOCommandKind, the return value from the driver is ignored. The driver calls IOCommandIsComplete at some future time. The Initialize and Finalize commands are sent to the driver as its first and last commands. Initialize gives the driver information it needs to start up. Finalize informs the driver that the system needs to unload it. Drivers receive all Open and Close calls, which connect the driver independently of initialization and finalization. Native drivers accept and respond to all command codes. The Read_Enable, write_Enable, Control_Enable, and Status_Enable bits in the DCE are ignored. Native drivers must keep track of I/O permissions for each instance of multiple open actions and return error codes if the permissions are violated.

The Device Manager 90 processes zero-length reads and writes on behalf of the driver. KillIO is no longer a control call; it is now its own command. For backward compatibility, the Device Manager 90 converts KillIO traps into KillIO commands. It passes the old csKillcode control call (csCode=1) without acting on it. The Code Fragment Manager 40 sends CFM initialization and termination calls to a driver when the driver is loaded and unloaded. The CFM initialization procedure, if present, will run prior to the driver being initialized by the Device Manager. It is possible that the driver will be loaded and its CFM initialization procedure run even though it is never opened and, therefore, never closed. It is important that any processing done by a CFM initialization procedure be undone by the CFM termination procedure. The Device Manager 90 may load a number of drivers looking for the best candidate for a particular device. Only the best driver is opened and remains loaded. All other CFM connections are closed, causing the CFM termination procedure to run. Native drivers 80 do not jump to the IODone procedure. To finish processing an I/O request, a genetic native driver calls IOCommandIsComplete to notify the Device Manager 90 that a given request has been completed.

To determine the kind of request or kind of command, the Device Manager 90 parameter block has procedure parameters called theCode and theKind. A native driver is reentrant to the extent that during any call from the driver to IOCommandIsComplete the driver may be reentered with another request. A native device driver does not have any sort of header. It will however, export a data symbol called TheDriverDescription. A driver uses this data structure to give header-like information to the Device Manager. The Device Manager 90 uses the information in TheDriverDescription to set the dCtlFlags field in the driver's DCE. A native device driver cannot make use of the dCtlEMask and dCtlMenu fields of its driver control block. Native drivers 80 are not used for creating desk accessories.

The following discussion illustrates exemplary driver structures that can be utilized within the present invention. The Native Driver package is a CFM code fragment. It can reside in RAM or in a device tree 10 as a property. In one exemplary implementation it may reside in the Macintosh ROM 103, in a PCI expansion ROM 103, or in the data fork of a file 104. File-based native driver code fragments contain no resource fork and have a file type of 'ndrv'. The Native Driver package may house various types of drivers. The driver is expected to support services defined for the particular device family. One predefined driver type is a generic type and is called 'ndrv' (not to be confused with the Native Driver file type 'ndrv'). The Native Driver package requires that at least one symbol be defined and exported by the CFM's export mechanism. This symbol must be named TheDriverDescription 80a and it is a data structure that describes the driver's type, functionality, and characteristics.

Depending on the type of driver, additional symbols must be exported. The generic 'ndrv' driver type requires that the CFM package export a single code entry point, DoDriverIO, which passes all driver I/O requests. DoDriverIO must respond to the Open, Close, Read, Write, Control, Status, KillIO, Initialize, Finalize, Replace, and Superseded commands. Native drivers must also keep track of I/O permissions for each instance of multiple open actions and return error codes if permissions are violated. Other driver types that support device families must export the symbols and entry points defined by the device family or device expert.

Driver Description Structure

A device driver presents the operating system 30 with a self-describing data structure called a driver description ("DriverDescription") 80a. As shown below with respect to a particular embodiment, the driver description ("DriverDescription") 80a is used by matching mechanism of the DLL 45 of the present invention to (1) match devices to drivers; (2) identify devices by category of functionality; (3) provide driver name information; (4) provide driver version information; (5) provide driver initialization information; and (6) allow replacement of currently installed driver. By providing a common structure to describe drivers 80, the operating system 30 is able to regularize the mechanisms used to locate, load, initialize, and replace them. The operation system 30 treats any code fragment that exports a DriverDescription structure as a driver within the present invention. The structure DriverDescription 80a is used to match drivers with devices, set up and maintain a driver's runtime environment and declare a driver's supported services. An exemplary structure is shown below wherein the "driver name" 80c (FIG. 5) is located within the driverType information:

```
struct DriverDescription {
    OSType              driverDescSignature;
    DriverDescVersion   driverDescVersion;
    DriverType          driverType;
    DriverOSRuntime     driverOSRuntimeInfo;
    DriverOSService     driverServices
};
typedef struct  DriverDescription  DriverDescription;
typedef struct  DriverDescription  *DriverDescriptionPtr;
enum {
    kTheDescriptionSignature = 'mtej'    /*first long of
                                           DriverDescription*/
};
typedef UInt32 DriverDescVersion;
enum {
    kInitialDriverDescriptor = 0 /*Version 1 of
    DriverDescription*/
};
```
Field descriptions:
driverDescSignature
    Signature of this DriverDescription structure;

currently 'mtej'.
driverDescVersion
    Version of this Driver Description structure, used to distinguish different versions of DriverDescription that have the same driverDescSignature.
driverType    Structure that contains driver name and version.
driverOSRuntimeInfo
    Structure that contains driver runtime information, which determines how a driver is handled when Mac OS finds it. This structure also provides the driver's name to Mac OS and specifies the driver's ability to support concurrent requests.
driverServices
    Structure used to declare the driver's supported programming interfaces.

Driver Type Structure

The DriverType structure contains the driver name 80c and version information about a driver, which is used by the present invention to match the driver to a specific device. A driver type structure is shown below:

```
struct DriverType {
    Str31       nameInfoStr;
    NumVersion  version;
}
    typedef UInt32   DeviceTypeMember;
    typedef struct   DriverType DriverType;
    typedef struct   DriverType *DriverTypePtr;
Field descriptions:
nameInfoStr  Name used to identify the driver and distinguish
             between various versions of the driver when an
             expert is searching for drivers. This string of type
             Str31 is used to match the PCI name property in
             the Name Registry.
version      Version resource used to obtain the newest driver
             when several identically-named drivers (that is,
             drivers with the same value of nameInfoStr) are
             available on disk.
```

Driver Runtime Structure

The DriverOSRuntime structure contains information that controls how the driver is used at run time as shown below:

```
struct DriverOSRuntime {
    RuntimeOptions   driverRuntime;
    Str31            driverName;
    UInt32           driverDescReserved[8];
};
typedef OptionBits    RuntimeOptions;
typedef struct DriverOSRuntime    DriverOSRuntime;
typedef struct DriverOSRuntime *DriverOSRuntimePtr;
enum {                            /*DriverOSRuntime bit*/
                                  /*constants*/
kdriverIsLoadedUponDiscovery
                    = 1,/*auto-load driver when
                         discovered*/
kdriverIsOpenedUponLoad
                    = 2,/*auto-open driver when
                         it is loaded*/
kdriverIsUnderExpertControl
                    = 4,/*I/O expert handles
                         loads and opens*/
kdriverIsConcurrent = 8,/*supports concurrent
                         requests*/
kdriverQueuesIOPB   = 0x10 /*Device Manager 90
                         does not queue IOPB*/
};
Field descriptions
driverRuntime   Options used to determine runtime behavior of
                the driver. The bits in this field have these
                meanings:
        Bit Meaning
                0 system loads driver when driver is
                   discovered
                1 system opens driver when driver is loaded
                2 device family expert handles driver loads
                   and opens
                3 driver is capable of handling concurrent
                   requests
                4 the Device Manager 90 does not queue the
                   IOPB to the DCE request before calling the
                   driver.
driverName      Driver name used by Mac OS if driver type
                is ndrv. Mac OS copies this name to the
                name field of the DCE. This field is unused
                for other driver types.
driverDescReserved  Reserved for future use.
```

Driver Services Structure

The DriverOSService structure describes the services supported by the driver that are available to applications and other software. Each device family has a particular set of required and supported services. A driver may support more than one set of services. In such cases, nServices should be set to indicate the number of different sets of services that the driver supports, see below:

```
struct DriverOSService {
    ServiceCount       nServices;
    DriverServiceInfo  service[1]
};
typedef UInt32 ServiceCount;
typedef struct DriverOSService DriverOSService;
typedef struct DriverOSService *DriverOSServicePtr;
Field descriptions
nServices  The number of services supported by this driver. This
           field is used to determine the size of the service array
           that follows.
service    An array of DriverServiceInfo structures that specifies
           the supported programming interface sets.
```

Driver Services Information Structure

The DriverServiceInfo structure describes the category, type, and version of a driver's programming interface services.

```
struct DriverServiceInfo {
    OsType      serviceCategory;
    OSType      serviceType;
    NumVersion  serviceVersion;
};
typedef struct  DriverServiceInfo   DriverServiceInfo;
typedef struct  DriverServiceInfo  *DriverServiceInfoPtr;
enum {                              /*used in*/
                                    /*serviceCategory*/
    kServiceCategoryDisplay = 'disp',       /*display*/
    kServiceCategoryopentransport = 'otan', /*open transport*/
    kServiceCategorvblockstorage = 'blok',  /*block storage*/
    kServiceCategorySCSISim = 'scsi',       /*SCSI SIM*/
    kServiceCategoryndrvdriver = 'ndrv'     /*generic*/
};
Field descriptions:
serviceCategory Specifies driver support services for given device
                family. The following device families are
                currently defined:
                Name    Supports services defined for:
                'blok'     block drivers family
                'disp'     video display family
                'ndrv'     gneric native driver devices
                'otan'     Open Transport
                'scsi'     SCSI interface module
serviceType     Subcategory (meaningful only in a given service
                category).
```

| | |
|---|---|
| serviceVersion | Version resource ('vers') used to specify the version of a set of services. It lets interfaces be modified over time. |

DoDriverIO Entry Point

Genetic 'ndrv' drivers must provide a single code entry point DoDriverIO, which responds to Open, Close, Read, Write, Control, Status, KillIO, Initialize, Finalize, Replace, and Superseded commands.

| | | |
|---|---|---|
| OSErr DoDriverIO | (AddressSpaceID | spaceID |
| | IOCommandID | ID, |
| | IOCommandContents | contents, |
| | IOCommandCode | code, |
| | IOCommandKind | kind); |
| typedef KernelID AddressSpaceID; | | |
| spaceID | The address space containing the buffer to be prepared. Mac OS 7.5 provides only one address space, so this field must be specified as kCurrentAddressSpaceID. | |
| ID | CommandID | |
| contents | An IOCommandContents I/O parameter block. Use the InitializationInfo union member when calling to initialize the driver, FinalizationInfo when removing the driver, DriverReplaceInfo when replacing, DriverSupersededInfo when superseding, and ParmBlkPtr for all other I/O actions. | |
| code | Selector used to determine I/O actions. | |
| kind | Options used to determine how I/O actions are performed. The bits in this field have these meanings: | |
| | Bit  Meaning | |
| | 0    synchronous I/O | |
| | 1    asynchronous I/O | |
| | 2    immediate I/O | |

DoDriverIO Parameter Data Structures

The data types and structures that the DoDriverIO entry point uses have the following declarations:

```
typedef UInt32 IOCommandID;
enum {
    kInvalidID = 0
};
union IOCommandContents {           /* Contents are command*/
                                    /* specific*/
    ParmBlkPtr              pb;
    DriverInitInfoPtr       initialInfo;
    DriverFinalInfoPtr      finalInfo;
    DriverReplaceInfoPtr    replaceInfo;
    DriverSupersededInfoPtr supersededInfo;
};
typedef union IOCommandContents IOCommandContents;
typedef UInt32 IOCommandCode;
enum{                       /*'ndrv' driver services*/
    kOpenCommand,           /*open command*/
    kCloseCommand,          /*close command*/
    kReadCommand,           /*read command*/
    kWriteCommand,          /*write command*/
    kControlCommand,        /*control command*/
    kStatusCommand,         /*status command*/
    kKillIOCommand,         /*kill I/O command*/
    kInitializeCommand,     /*initialize command*/
    kFinalizeCommand,       /*finalize command*/
    kReplaceCommand,        /*replace driver command*/
    kSupersededCommand      /*driver superseded command*/
};
typedef UInt32 IOCommandKind;
enum{
    kSynchronousIOCommandKind = 1,
    kAsynchronousIOCommandKind = 2,
    kImmediateIOCommandKind = 4
};
struct DriverInitInfo {
    DriverRefNum    refNum;
    RegEntryID      deviceEntry;
};
struct DriverFinalInfo {
    DriverRefNum    refNum;
    RegEntryID      deviceEntry;
};
typedef struct DriverInitInfo    DriverInitInfo,   *DriverInitInfoPtr;
typedef struct DriverInitInfo    DriverReplaceInfo, *DriverReplaceInfoPtr;
typedef struct DriverFinalInfo   DriverFinalInfo,  *DriverFinalInfoPtr;
typedef struct DriverFinalInfo   DriverSupersededInfo, *DriverSupersededInfoPtr;
struct InitializationInfo {
    refNum          refNum;
    RegEntryID      deviceEntry;
};
struct FinalizationInfo {
    refNum          refNum;
    RegEntryID      deviceEntry;
};
```

Getting Command Information

Any command in progress that the Device Manager 90 has sent to a native driver can be examined using GetIOCommandInfo.

GetIOCommandInfo

| | | |
|---|---|---|
| OSErr Get-IOCommandInfo | (IOCommandID | theID, |
| | IOCommandContents | *theContents, |
| | IOCommandCode | *theCommand, |
| | IOCommandKind | *theKind); |
| theID | Command ID | |
| theContents | Pointer to the IOPB or Initialize/Finalize contents | |
| theCommand | Command code | |
| theKind | Command kind (synchronous, asynchronous, or immediate) | |

GetIOCommandInfo returns information about an active native driver I/O command. It will not work after a driver has completed a request.

```
typedef struct InitializationInfo  InitializationInfo;
typedef struct InitializationInfo  *InitializationInfoPtr;
typedef struct FinalizationInfo    FinalizationInfo;
typedef struct FinalizationInfo    *FinalizationInfoPtr;
```

Responding to Device Manager 90 Requests

Native drivers 80 respond to Device Manager 90 requests by handling a single call, DoDriverIO. Native drivers 80 must also keep track of I/O permissions for each instance of multiple open actions and return error cedes if permissions are violated. The DoDriverIO call interface is described in the above discussion. The following sections discuss some of the internal procedures a driver 80 uses to service DoDriverIO requests.

Initialization and Finalization Routines

The Device Manager 90 sends Initialize and Finalize commands to a native driver as its first and last commands. The Initialize command gives the driver startup information and the Finalize command informs the driver that the system would like to unload it. Open and Close actions are separate from initialization and finalization rather than using Open and Close calls as the initialization and finalization mechanism. A typical framework for a generic driver handler for Device Manager 90 finalization and CFM initialization and termination commands is shown below:

```
refNum        MyReferenceNumber;
RegEntryID    MyDeviceID;
OSErr DoInitializeCommand
        (refNum myRefNum, regEntryIDPtr myDevice)
{
    //Remember our refNum and Registry Entry Spec
    MyReferenceNumber = myRefNum;
    MyDeviceID = *myDevice;
    return noErr;
}
OSErr DoFinalizeCommand
        (refNum myRefNum, RegEntryIDPtr myDevice)
{
#pragma unused (myRefNum, myDevice)
    return noErr;
}
CFMInitialize ( )
{
    return noErr;
}
CFMTerminate ( )
{
    return noErr;
}
```

The driver's initialization procedure first check the device's AAPL, address property to see that needed resources have been allocated. The initialization code also allocates any private storage the driver requires and place a pointer to it in the static data area that the Code Fragment Manager 40 provides for each instance of the driver. After allocating memory, the initialization procedure performs any other preparation required by the driver. If the handier fails to allocate memory for private storage it returns an appropriate error code to notify the Device Manager 90 that the driver did not initialize itself.

In an exemplary embodiment, if the Open Firmware FCode in the device's expansion ROM 103 does not furnish either a driver, AAPL, MAacOS, PowerPC property or a unique name property, or if the driver's PCI vendor-id and device-id properties are generic, then the initialization procedure checks that the device is the correct one for the driver. If the driver has been incorrectly matched, the initialization procedure must return an error code so the Device Manager 90 can attempt to make a match. The driver's finalization procedure must reverse the effects of the initialization procedure by releasing any memory allocated by the driver, removing interrupt handlers, and canceling outstanding timers. If the finalization procedure cannot complete the finalization request it can return an error result code. In any event, however, the driver will be removed.

Open and Close Routines

A native device driver 80 utilizes both an open procedure and a close procedure. The current system software does not require that these procedures perform any specific tasks, however, the driver should keep track of open calls to match them with close calls. Open and close procedures are immediate. Typical code for keeping track of open and close commands is shown below:

```
long myOpenCount;
OSErr DoOpenCommand (ParmBlkPtr thePb)
{
    myOpenCount++;
    return noErr;
}
OSErr DoCloseCommand (ParmBlkPtr thePb)
{
    myOpenCount—;
```

```
    return noErr;
}
```

Read and Write Routines

Driver read and write procedures implement I/O requests. These procedures can execute synchronously or asynchronously. A synchronous read or write procedure must complete an entire I/O request before returning to the Device Manager 90, an asynchronous read or write procedure can begin an I/O transaction and then return to the Device Manager 90 before the request is complete. In this case, the I/O request continues to be executed, typically when more data is available, by other procedures such as interrupt handlers or completion procedures. Below is an example listing:

```
short  myLastErr;              /* Globals */
long   myLastCount;
OSErr DoReadCommand            (IOpb pb)
{
    long numsytes;
    short myErr;
    numbytes = pb→IORegCount;
        {
            /* do the read into pb→iobuffer*/
        }
    myLastErr = myErr;         /* store in globals */
    return (myErr);
}
```

Control and Status Routines

Control and status procedures are normally used to send and receive driver-specific information. Control and status procedures can execute synchronously or asynchronously. Below shows a sample control procedure.

DoControlCommand.

```
MyDriverGlobalsPtr    dStore;
OSErr DoControlCommand (ParamBlkPtr pb)
{
    switch (pb→csCode)
    {
        case kClearAll:
            dStore→byteCount = 0;
            dStore→lastErr = 0;
            return(noErr);
        default: /* always return controlErr for unknown */
        /* csCode */
            return(controlErr);
    }
}
```

The status procedure should work in a similar manner. The Device Manager 90 uses the csCode field to specify the type of status information requested. The status procedure should respond to whatever requests are appropriate for the driver and return the error code statusErr for any unsupported csCode value. The Device Manager 90 interprets a status request with a csCode value of 1 as a special case. When the Device Manager 90 receives such a status request, it returns a handle to the driver's device control entry. The driver's status procedure never receives this request.

KillIO Routine

Native driver killIO procedures take the following form:

```
OSErr DoKillIOCommand (ParmBlkPtr thePb)
{   /*  Check internal queue for request to be killed; if
        found, remove from queue and free request */
    return noErr;
}   /*  Else, if no request located */
    return abortErr;
thePb   Pointer to a Device Manager parameter block
```

When the Device Manager 90 receives a KillIO request, it removes the specified parameter block from the driver I/O queue. If the driver responds to any requests asynchronously, the part of the driver that completes asynchronous requests (for example, an interrupt handler) might expect the parameter block for the pending request to be at the head of the queue. The Device Manager 90 notifies the driver of KillIO requests so it can take the appropriate actions to stop work on any pending requests. The driver must return control to the Device Manager 90 by calling IOCommandIsComplete.

Replace and Superseded Routines

Under certain conditions, it may be desirable to replace an installed driver 80. For example, a display card may use a temporary driver during system startup and then replace it with a better version from disk once the file system is running and initialized. Replacing an installed driver is a two-step process. First, the driver to be replaced is requested to give up control of the device. Second, the new driver is installed and directed to take over management of the device. In one embodiment, two native driver commands are reserved for these tasks. The kSupersededCommand selector tells the outgoing driver to begin the replacement process. The command contents are the same as with kFinalizeCommand. The outgoing driver should take the following actions: (1) If it is a concurrent driver, it should wait for current I/O actions to finish. (2) Place the device in a "quiet" state. The definition of this state is device-specific, but it can involve such tasks as disabling device interrupts. (3) Remove any installed interrupt handlers. (4) Store the driver and the device state in the Name Registry as one or more properties attached to the device entry. (5) Return noErr to indicate that the driver is ready to be replaced. (6) The kReplaceCommand selector tells the incoming driver to begin assume control of the device. The command contents are the same as a kInitializeCommand.

The incoming driver should take the following actions: (1) Retrieve the state stored in the Name Registry and delete the properties stored by the Superseded command. (2) Install interrupt handlers. (3) Place the device in an active state. (4) Return noErr to indicate that the driver is ready to be used.

IV. Driver Loader Library

Figure 6:
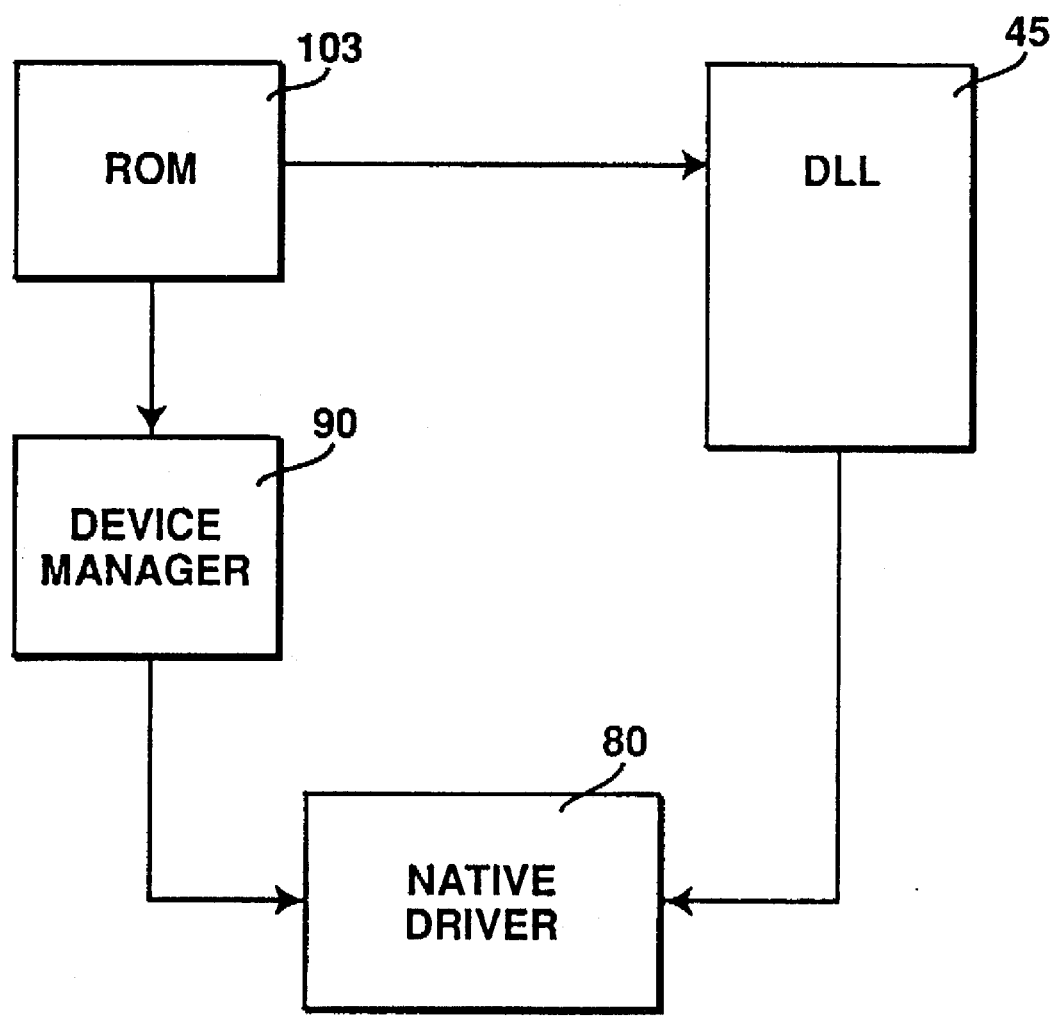
FIG. 6 illustrates relationships of the Device Manager, the ROM, and the DLL of the present invention.
Figure 7:
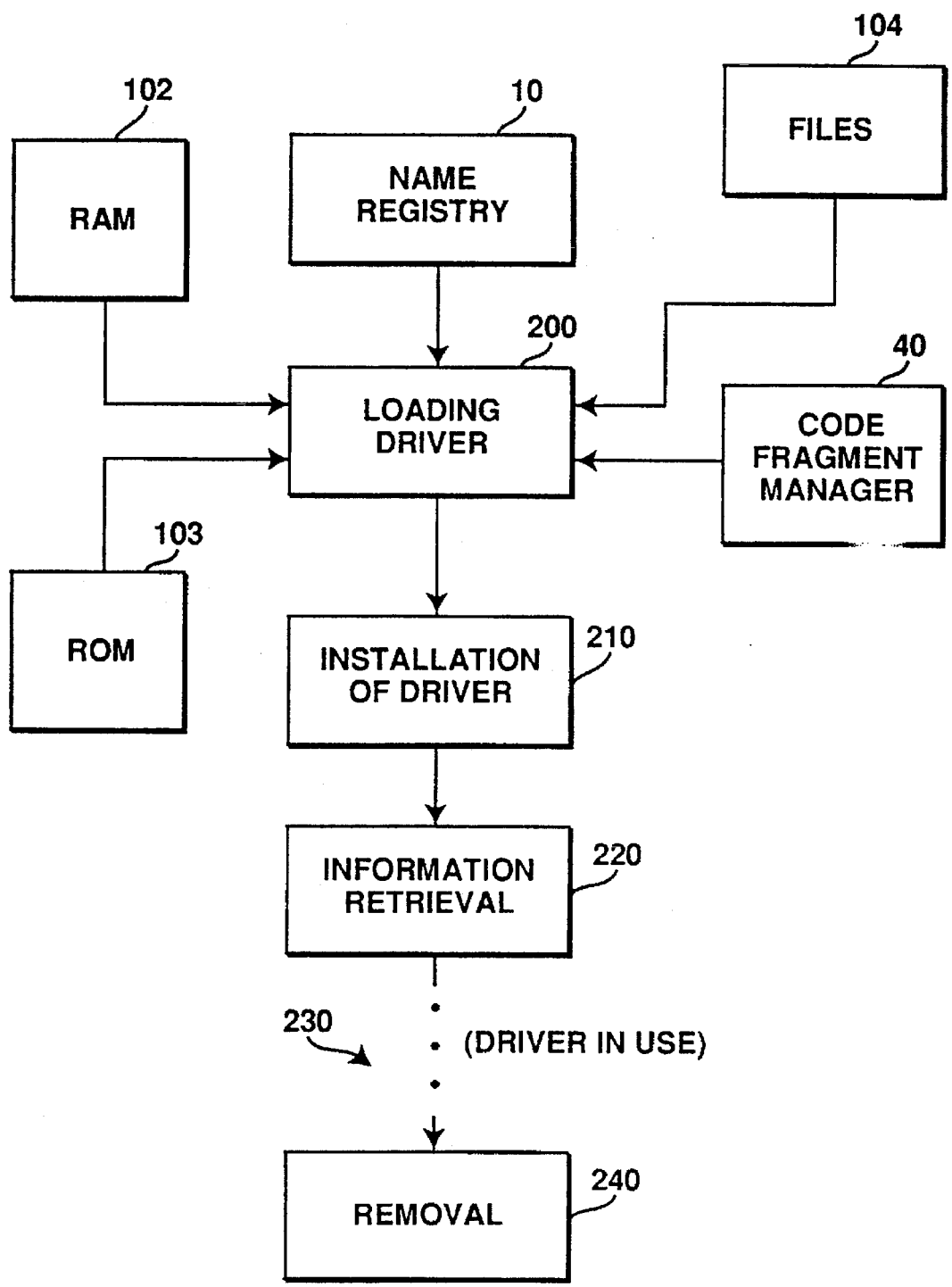
FIG. 7 is an illustration of functionality groups of the DLL of the present invention, including loading and installation of drivers.

With reference to FIG. 6, the Driver Loader Library 45 (DLL) of the present invention is further discussed. FIG. 6 illustrates the relationships of the DLL 45, ROM 103, the Device Manager 90, and a driver 80 of the present invention. The Device Manager 90 communicates with a native driver 80 (for example, open, close, read, write, control, status, killIO, Replace, and Superceded commands). The Device Manager 90 also communicates with the DLL 45. The DLL 45 gives commands to the native driver 80 such as Initialize and finalize commands. In one implementation, the DLL 45 is a CFM shared-library extension of the Device Manager 90 and provides services to locate, install, and remove genetic drivers. The DLL 45 utilizes procedures of the CFM 40 for operation. The DLL 45 provides services that control aspects of driver to device matching under the present invention and also driver loading and installation. Under the present invention, driver loading is an automatic processes that frees drivers from having to perform device matching themselves.

FIG. 7 illustrates functions of the DLL 45 of the present invention. At logic block 200, the present invention performs driver loading which includes determination of a particular driver for a particular device of the device tree 10 database. In order to perform this, logic block 200 interfaces with the name registry (also called device tree 10 database) and also with RAM unit 102 and ROM unit 103. Drivers may be located in these memory units. The file storage 104 (where drivers may be located in the device driver folder) is also coupled to communicate with the logic block 200. The CFM 40 is also coupled with block 200. The DLL 45 performs device loading in block 200 as well as device installation 210 once an appropriate driver is selected for a device. At block 220, information retrieval is performed which allows a user to retrieve particular information about a recognized driver. Also, the DLL 45 of the present invention performs driver removal at block 240. These functions will be discussed in further detail to follow.

Figure 8:
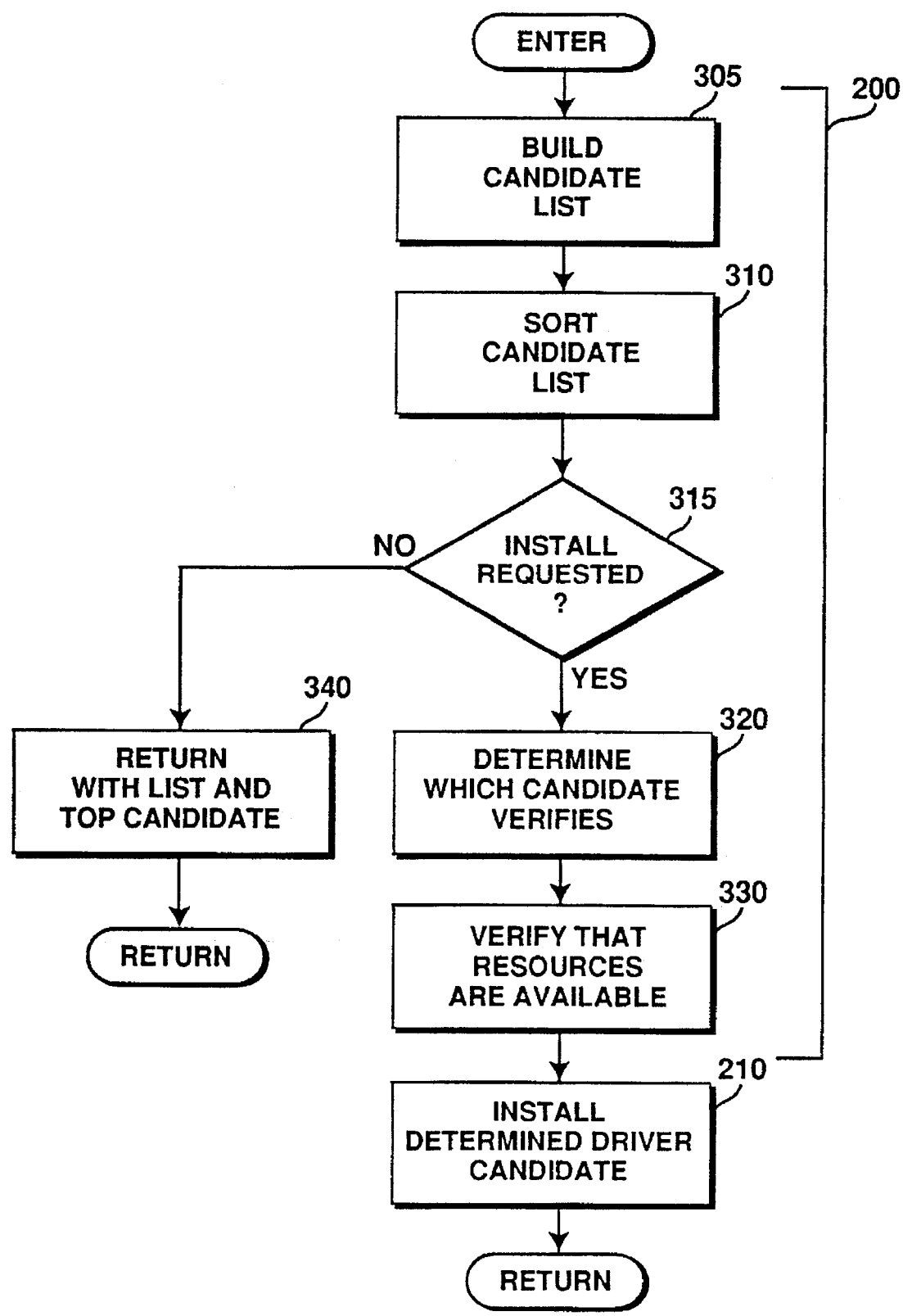
FIG. 8 illustrates a flow diagram (logic) of a procedure of the present invention for performing driver matching against a particular device using candidate lists.
Figure 9:
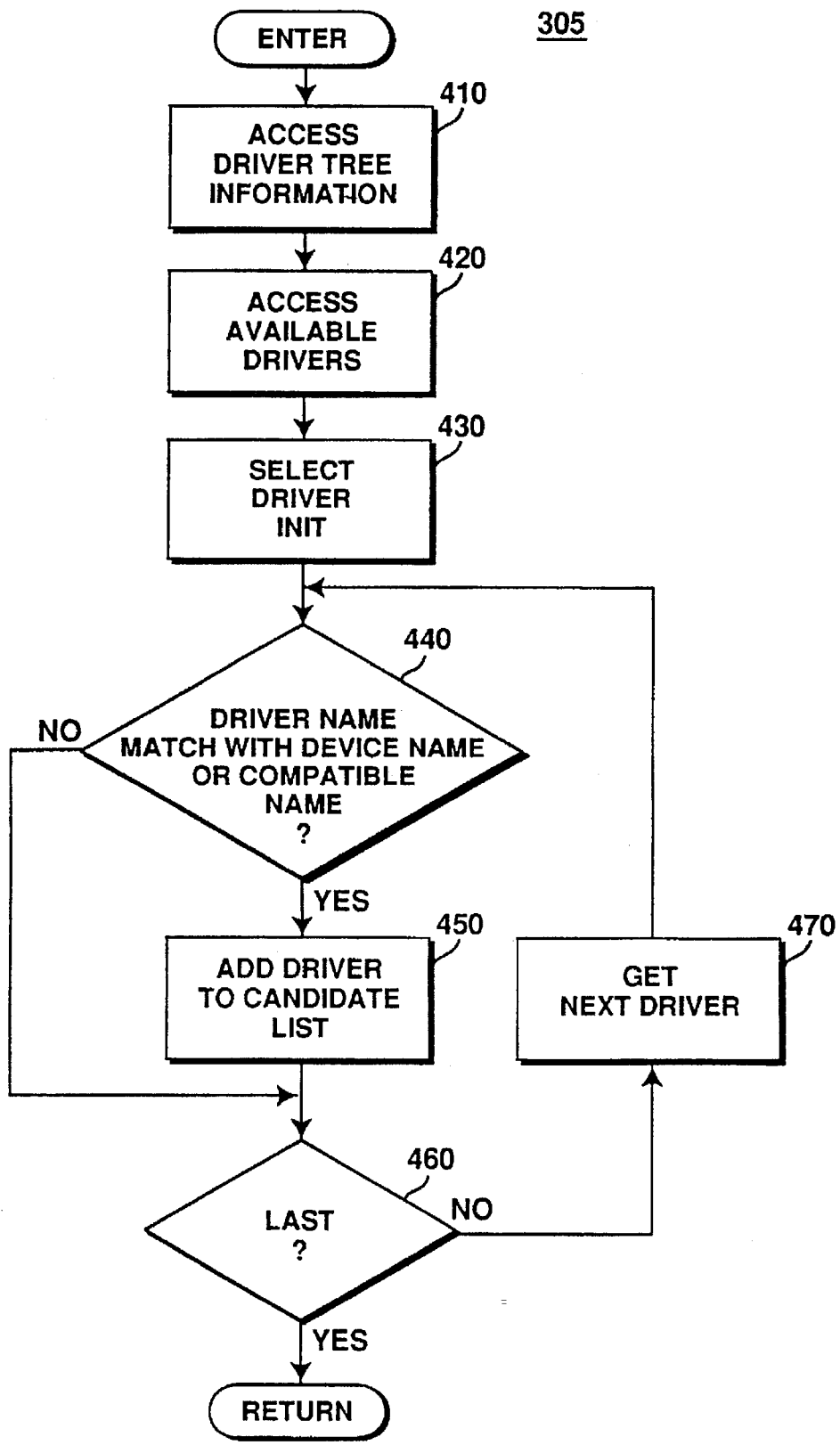
FIG. 9 illustrates a flow diagram (logic) of procedure of the present invention for constructing a candidate list for a particular device indicated in the device tree database.

FIG. 8 illustrates a flow diagram of processing performed by the DLL 45 of the present invention for automatically matching device drivers 80 to a particular identified or selected device of the devices reported in the device tree 10 database using candidate lists and sorting. This process is repeated for each device of the device tree 10 starting from the top and continuing downward through the tree 10. Processing 200 is invoked upon a request to locate a driver for a given or "selected" device. Processing logic 200 starts at block 305 wherein a candidate list is constructed and is associated with the selected device. This list contains a grouping of those drivers having a driver name that matches with the given device's device name or compatible device name. These drivers represent a set of drivers that perhaps will properly configure the given device. FIG. 9 illustrates the steps performed by logic block 305 in more detail.

With reference to FIG. 8, after a candidate list is constructed, the present invention flows to logic block 310 wherein the candidate list is sorted by priority ranking as to which members of the candidate list are more than likely to match with the selected device and those drivers that are less likely to match with the selected device. The steps performed by logic block 310 are further described with reference to FIG. 10. With reference to FIG. 8, at block 315 the present invention determines if a request was made to the DLL 45 to actually install a driver to the selected device (e.g., or just report the "best" driver candidate). If not, then at block 340 the present invention returns the calling procedure with (1) the top candidate of the sorted candidate list and/or (2) the entire sorted candidate list. Process 200 then exits after this function is complete.

With reference to FIG. 8, if block 315 determines that the calling entity requires that a driver be installed with respect to the selected device, then at block 320 the present invention determines the first driver of the sorted candidate list with the highest priority matching with the selected driver. This is performed by sequentially installing the drivers of the sorted candidate list and determining if the installation is successful. At block 320, a driver can be determined or an error message can be returned indicating that no driver of the candidate list properly matched with the selected device. If the latter occurs, then processing returns out of block 200 without an installation and the selected device is not active. If at the completion of processing logic block 320, it is determined that a particular driver of the candidate list properly validated with the selected device, then at logic block 330, the present invention verifies that any resources needed for the driver's proper operation are actually available within the computer system 120.

At block 330, the present invention instructs the operating system 30 to scan the devices of the computer system 120 to determine if all of the devices that the selected device needs to operate (the "parent devices") are present within the computer system 120. If the parent devices are present, then the selected driver can be installed. Since devices of the device tree 10 database are processed through the DLL 45 of the present invention from top to bottom, the parent devices for a particular selected device should be operational (e.g., processed through blocks 200 and 210) before the selected device is processed by the present invention. If the required parent devices are not operational yet or not present, then block 210 is avoided. If the required resources are available, then at block 210 the present invention performs an installation wherein the determined driver is installed with respect to the selected device and the device becomes active. It is appreciated that the processing of logic blocks 200 and 210 are typically performed at initialization for each device of the device tree 10 database, starting with the top node and working down the device tree 10 so that parent devices are configured first before their child devices are configured.

With reference to FIG. 9, a flow diagram is illustrated describing the logic steps of the logic 305 of the present invention DLL 45 in constructing a candidate list of drivers for the selected device. Logic 305 starts at block 410 wherein pertinent information regarding the device nodes of the device tree 10 database are accessed for the particular device. If the particular device has an associated driver within its node of the device tree 10 (e.g., a "default driver"), processing continues because this default driver can become replaced by an updated driver depending on the priority of the drivers in the candidate list built for the selected device. At block 410, the present invention obtains the following properties: (1) the device name 50; and (2) the compatible names 60a of the selected device (see FIG. 4) located within the compatible property 60. After the information of logic block 410 is accessed, the present invention at logic block 420 then access the available drivers recognized in the system to construct a first set of drivers. These drivers may reside in the device tree 10 database, in the ROM 103, in RAM 102 and in the extensions folder (e.g., device driver folder) of the disk drive 104. At block 430, the present invention selects a first driver for comparison. This driver is the "given driver." At block 430, the candidate list for the selected device is then cleared so the new list can be created.

At logic block 440, the present invention examines the DriverDescription 80a information for this given driver to determine the driver name 80c (FIG. 5) of the given driver which is stored in the DriverDescription, in one embodiment, as the "nameinfostr field" of the deviceType structure for the given driver. Importantly, at logic block 440, the present invention performs a comparison between: (1) the device name 50 of the selected device and the driver name 80c of the given driver; and also between (2) each compatible name 60a of the selected device against the driver name 80c of the given driver. If there is a match between (1) or (2) above, then the match characteristics are recorded (e.g., was it match by (1) or by (2)) and at logic block 450, the given driver is added to the candidate list for the selected device if a match in 440 happened. It is appreciated the candidate list can be stored in RAM 102. The processing of the present invention then flows to logic block 460. If there was not a match at block 440, then the present invention flows to block 460 without adding the given driver to the candidate list.

At block 460, the present invention determines if the given driver is the last driver of the drivers discovered in block 420 (e.g., those drivers recognized by the computer system 120). If so, then the process 305 exits from block 460. If not, then logic block 460 is exited and processing flows to block 470 wherein the present invention selects the next driver of the set of drivers discovered in block 420. This next driver is then the "given driver" and processing returns to block 440 to determine if this next given driver should be added to the selected device's candidate list. As with any driver, the next driver selected at block 470 can reside in RAM 102, in an extension ROM 103 within the device tree 10, or within a file on the disk 104. At the completion of process 305, an unsorted candidate list is then constructed for the selected driver and is stored in RAM 102.

Figure 10:
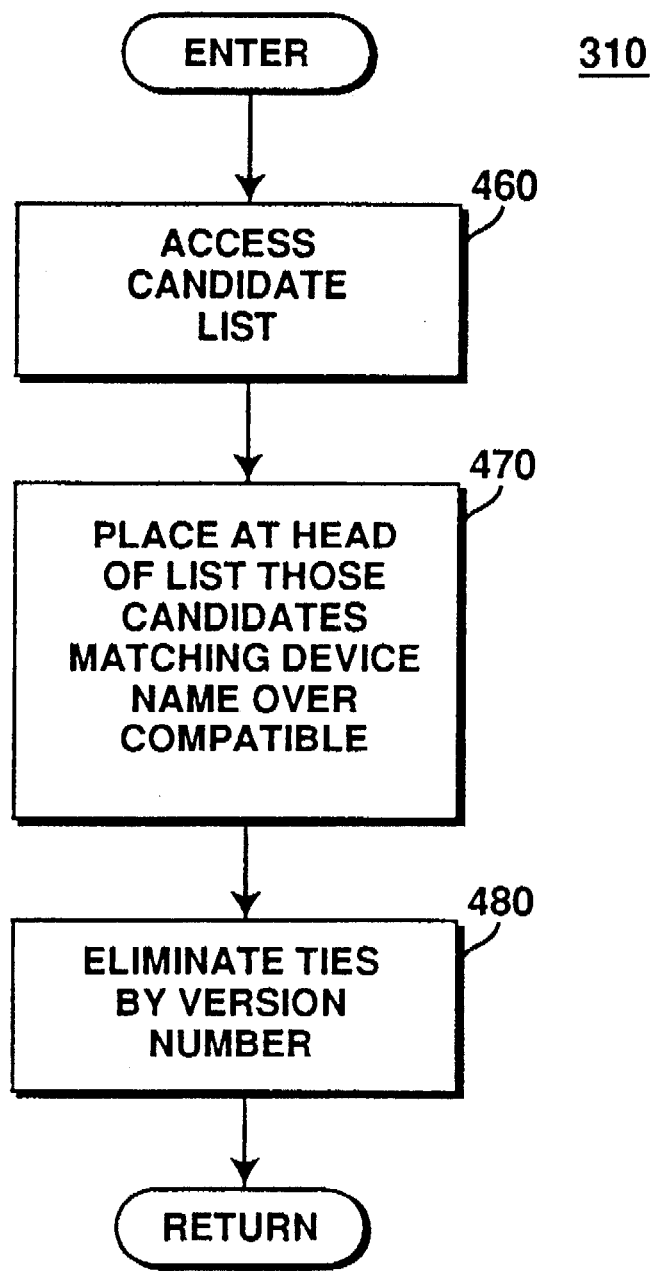
FIG. 10 illustrates a flow diagram (logic) of procedure of the present invention for sorting a candidate list of a particular device indicated in the device tree database.

With reference to FIG. 10, the logic steps of logic block 310 are illustrated. Block 310 performs the candidate list sorting for a particular candidate list associated with the selected driver. At block 460, the candidate list for the selected device is accessed in RAM 102. This is a candidate list generated by logic 305 and is particular to the selected driver. At block 470, the present invention sorts the candidate list and places those drivers at the top or head of the candidate list that have a driver name 80c that matched with the device name 50 of the selected device. At the same time or sequentially, block 480 resolves any prioritization ties by using version information stored in the driver description between drivers of the candidate list. Those drivers with a more appropriate version (e.g., highest version or version closest to the selected driver) are placed higher in the candidate list priority. Block 470 then places in lower priority those drivers having a driver name 80c that matched with the selected driver's compatible names 60a. Again, version information (in logic block 480) with respect to these drivers is used to perform prioritization the same as discussed above. At the completion of block 480, the candidate list for the selected device is sorted by priority of most likely for validation (e.g., most likely to be compatible with the selected device).

Figure 11:
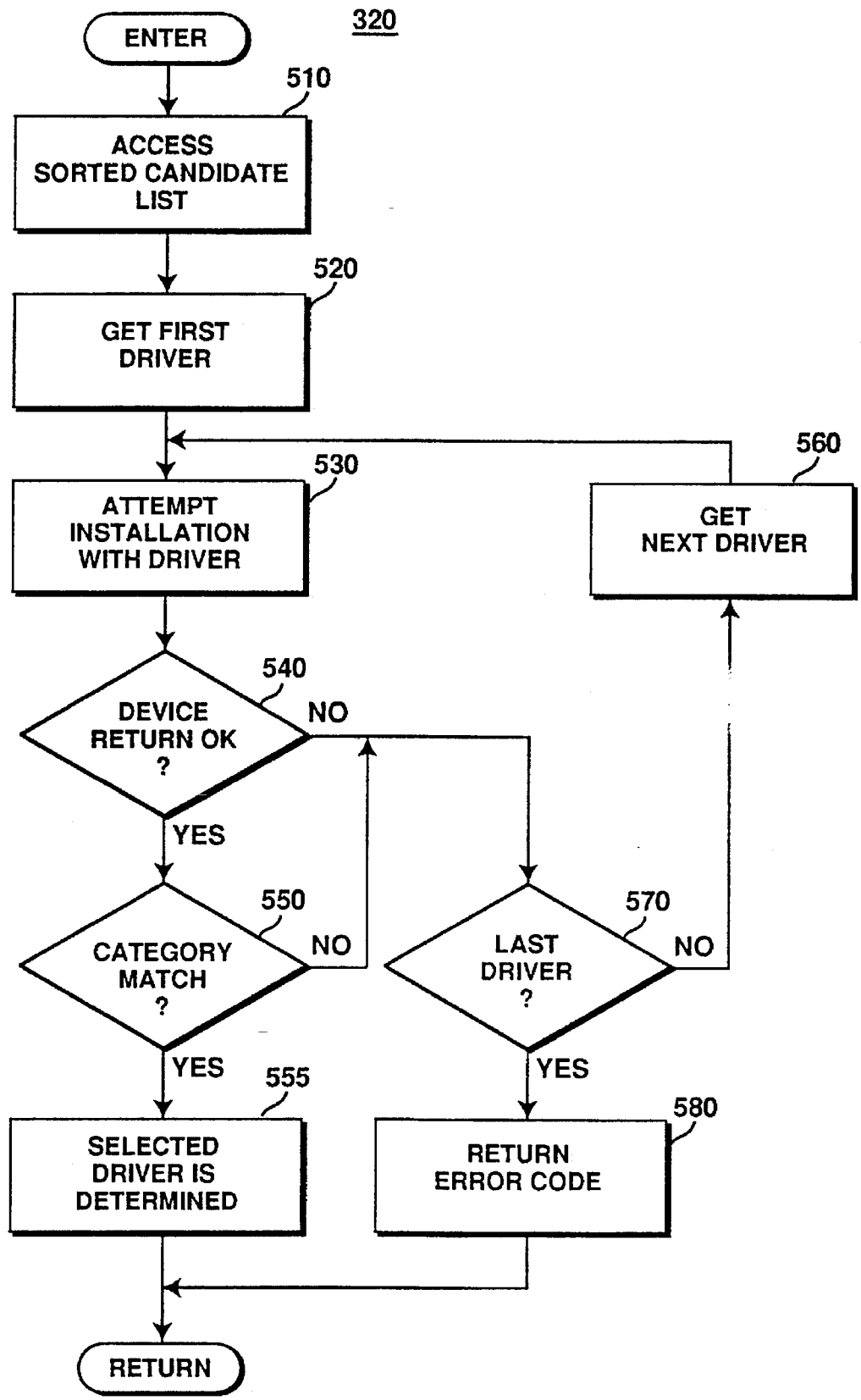
FIG. 11 illustrates a flow diagram (logic) of procedure of the present invention for sequentially applying drivers of a candidate list to a particular device associated with that list to automatically determine an appropriate driver for the particular device.

With reference to FIG. 11, the logic steps of logic block 320 of the present invention are illustrated. Block 320 performs a procedure of attempted installation of the drivers of the candidate list for the particular device (e.g., a trial and error approach based on the prior information compiled by the present invention). At logic step 510, the present invention accesses the sorted candidate list for the particular device. At block 520, the present invention accesses or "gets" the first driver of this candidate list. At block 530, the present invention attempts to install this selected driver with the selected device to validate the match. The selected driver validates the match by probing the device and performing some diagnostic operations between the selected driver and the device. Any number of different diagnostic operations can be used within the scope of the present invention for this step. Assuming the selected driver is appropriate, at logic block 540, the selected driver confirms the validation by returning a "no error" status flag to the DLL 45. If an error status was returned, or the "no error" status fails to return, then processing flows to logic block 570 wherein the present invention determines if the selected driver was the last driver of the selected candidate list for the selected device. If not, processing flows to block 560 wherein the present invention selects the next driver in sequential (e.g., priority) order from the sorted candidate list of the selected device. Processing then flows back to block 530 to determine if the next driver will validate the match with the selected device.

At block 570, if the selected driver happens to be the last driver of the sorted candidate list, then at block 580, the present invention returns an error code indicating that no compatible driver could be found for the selected device. Returning to block 540, the present invention flows to logic 550 if the selected driver did indeed match with the selected device. At block 550, the selected driver's category information is then compared against the category information of the selected device which is stored in the device tree 10 as property information. If no match is performed between the categories, then the match is not validated, so processing returns to logic block 570. If the categories match, then at block 555, the selected driver is said to be determined and a proper validation of the match occurs between it and the selected device. This information is then returned from block 320.

The operating system 30 can utilize the above logic of the present invention at various times, but in one embodiment it is used during the boot phase and at any time a new device is added to the device tree 10 (which can also add new drivers to the available list of drivers used by the present invention). It is appreciated that as the system boots and new devices are configured and "wake up" and are added to the device tree 10 (by IEEE P.1275), it is possible for a device to be assigned a driver via the present invention and then re-assigned a newer or more appropriate driver later as they become available during the boot phase. In other words, drivers located on the hard disk are not available until the hard disk itself becomes configured as a device. In such case, the scope of drivers available at block 420 (FIG. 9) of the present invention is dynamic during the boot phase and will increase as soon the as hard drive is properly configured. In this example, a particular device can be initially configured with a driver from ROM and subsequently can be reconfigured with a more appropriate driver from the driver folder of the hard drive because the new driver will become higher in the candidate list (over the old driver) upon subsequent processing of the particular device by the present invention. Therefore, the candidate lists for a particular device are dynamic in that they will grow depending on the set of drivers that are available within the computer system 120 and recognized by the present invention.

More specifically, the processing for matching a driver with a particular device can operate at a first time given a first set of drivers recognized by the system. A high priority driver from a first candidate list can then be determined from the present information. Later, at some subsequent time a new, larger set of device drivers can become available that will lead the present invention to generate a second, updated candidate list which will indicate a new, more updated high priority driver. If this occurs, the present invention will remove the original high priority driver from the particular device and replace it with the updated high priority driver, see below under "Driver Replacement."

Below is a description of a particular, exemplary, embodiment of the present invention DLL 45 service procedures and driver handling. It is appreciated that while a particular platform is presented below, the functionality of the present invention can be readily adapted to a variety of different platforms and the below discussion is exemplary only of a particular implementation.

Loading and Unloading

In one embodiment, a driver 80 of the present invention may be loaded from any CFM container (in memory, files, or resources) as well as from a device's driver property in the Name Registry 10. The following services are provided for this purpose: (1) GetDriverMemoryFragment loads a driver from a memory range; (2) GetDriverDiskFragment loads a driver from a file; (3) FindDriverCandidates and ScanDriverCandidates prepare a list of file-based drivers that potentially match a device; (4) FindDriversForDevice finds the "best" drivers for a device, searching both ROM and disk, without making a CFM connection; (5) GetDriverForDevice finds the "best" driver for a device and returns its CFM connection ID; (6) SetDriverClosureMemory determines whether or not memory is held for a driver.

One circumstance in which FindDriversForDevice or GetDriverForDevice is required is when there is a device node in the device tree 10 that does not have an associated driver. One instance when this might happen is if a PCI card is entered in the device tree 10 after system startup. FindDriversForDevice does not create a CFM connection for the driver it finds. This service is useful if there is a need to browse potential drivers for a device without loading them. GetDriverForDevice finds the driver and creams a CFM connection for it.

In one embodiment, the successful load of a driver yields the following results: (1) a CFM ConnectionID; (2) a pointer to the Driver Description; (3) a pointer to the DoDriverIO entry point. If the driver has a CFM initialization procedure, it will be executed. The initialization procedure should return noErr to indicate a successful load. Note that multiple drivers may be loaded in order to determine the best device to driver match. Therefore, a driver's CFM initialization procedure should not allocate resources that cannot be released in its termination procedure.

GetDriverMemoryFragment

GetDriverMemoryFragment loads a code fragment driver from an area of memory.

```
OSErr GetDriverMemoryFragment
    (Ptr        memAddr,
    long       length,
    Str63                        fragName,
    ConnectionID                 *fragmentConnID,
    NuDriverEntryPointPtr        *fragmentMain,
    DriverDescriptionPtr         *theDriverDesc);
    memAddr        pointer to the beginning of the fragment in
                   memory
    length         length of the fragment in memory
    fragName       optional name of the fragment (primarily
                   used by debugger)
    fragmentConnID resulting CFM connectionID
    fragmentMain   resulting pointer to DoDriverIO (may be
                   nil)
    theDriverDesc  resulting pointer to DriverDescription
```

Given a pointer to the beginning of a driver code fragment in memAddr and the length of that fragment in length, GetDriverMemoryFragment loads the driver. It returns the loaded driver's CFM connectionID value in fragmentConnID, a pointer to its DoDriverIO entry point in fragmentMain, and a pointer to its driver description structure in theDriverDesc.

RESULT CODES

| | | |
|---|---|---|
| noErr | 0 | No error |
| All CFM errors | | |

GetDriverDiskFragment

GetDriverDiskFragment loads a code fragment driver from a file using the CFM search path.

```
OSErr GetDriverDiskFragment
    (FSSpecPtr                   theFragmentSpec,
    ConnectionID                 *fragmentConnID,
```

```
        NuDriverEntryPointPtr      *fragmentMain,
        DriverDescriptionPtr        theDriverDesc);
fragmentSpec      pointer to a file system specification
fragmentConnID    resultingCFM connectionID
fragmentMain      resulting pointer to DoDriverIO
driverDesc        resulting pointer to DriverDescription
```

Given a pointer to a CFM file system specification, Get-DriverDiskFragment uses the CFM search path to find and load a driver code fragment. It returns the loaded driver's CFM connectionID value in fragmentConnID, a pointer to its DoDriverIO entry point in fragmentMain, and a pointer to its Driver Description in theDriverDesc.

RESULT CODES

| | | |
|---|---|---|
| noErr | 0 | No error |
| fnfErr | −43 | File not found |
| All CFM errors | | |

FindDriverCandidates

```
OSErr FindDriverCandidates
    (RegEntryIDPtr           deviceID,
    Ptr                      *propBasedDriver,
    RegPropertyValueSize     *propBasedDriverSize,
    StringPtr                deviceName,
    DriverType               *propBasedDriverType,
    Boolean                  *gotPropBasedDriver,
    FileBasedDriverRecordPtr fileBasedDrivers,
    ItemCount                *nFileBasedDrivers);
deviceID              Name Registry ID of target device
propBasedDriver       Address of property-based driver
propBasedDriverSize   Size of property-based driver
deviceName            Name of device
propBasedDriverType   Type of property-based driver
gotPropBasedDriver    True if property-based driver was found
fileBasedDrivers      List of sorted file-based driver records
nFileBaseDrivers      Count of file-based driver records
```

Given the name entry ID of a device, FindDriverCandidates constructs a candidate list of file-based drivers that match the device name 50 or one of the device-compatible names 60a. The list is sorted from best match to least favorable match. In one embodiment, drivers 80 that match the device name are listed before drivers that match a compatible name. Each of these groups are further sorted by version numbers, using the HigherDriverVersion service. Property-based drivers are always matched using the device name and are returned separately from file-based drivers. An I/O expert can determine a property-based driver's randing using the HigherDriverVersion service. If a property-based driver is not found, all outputs are zeroed. If a nil list output buffer is passed, only the count of matched file-based drivers is returned. An I/O expert can call FindDriverCandidates first with a nil buffer, allocate a buffer large enough for the list, and then call FindDriverCandidates again with the appropriately-sized buffer. If a nil value is passed in deviceID, all drivers from the Extensions folder are returned. When using this option, pass nil values for all parameters except fileBasedDrivers and nFileBasedDrivers. The list of matched drivers consists of an array of file-based driver records:

```
struct FileBasedDriverRecord {
    FSSpec      theSpec;        /* file specification*/
    DriverType  theType;        /* nameInfoStr + version
                                /* number*/
    Boolean     compatibleProp; /* true if matched using a
                                   compatible name*/
    UInt8       pad[3];         /* alignment*/
};
typedef struct FileBasedDriverRecord
FileBasedDriverRecord, *FileBasedDriverRecordPtr;
```

A file-based driver consists of a file specification, the driver's type, and whether the driver was matched using the device name or a compatible device name. An I/O expert can use the program logic summarized below to cycle through a list of file-based candidates.

```
FindDriverCandidates ( );    /* get list of candidates for a device*/
while (Candidates in the list)
{
    GetDriverFromFile (FSSpec-in-Record,
    &driverConnectionID);
    if (initializeThisDriver(Candidate) ==
    NotMyHardwareError))
    {
        // Unhold this failed drivers memory
        // and Close its CFM Connection
        UnloadTheDriver (driverConnectionID);
        // Advance to next position in the list.
        GetNextCandidate( );
    }
    else
        break; // driver loaded and initialized.
}
```

RESULT CODES

| | | |
|---|---|---|
| noErr | 0 | No error |
| fnfErr | −43 | File not found |
| All CFM errors | | |

ScanDriverCandidates

```
OSErr ScanDriverCandidates
    (RegEntryIDPtr            deviceID,
    FileBasedDriverRecordPtr  fileBasedDrivers,
    ItemCount                 nFileBasedDrivers,
    FileBasedDriverRecordPtr  matchingDrivers,
    ItemCount                 *nMatchingDrivers);
deviceID           Name Registry ID of target device
fileBasedDrivers   List of sorted file-based driver records
nFileBasedDrivers  Count of file-based driver records
matchingDrivers    File-based driver records (a subset of
                   fileBasedDrivers)
nMatchingDrivers   Count of driver records
                   (<= nFileBasedDrivers)
```

Given the name entry ID of a device and a list of FileBasedDriverRecord elements, ScanDriverCandidates constructs a list of matching file-based drivers that match the device name or one of the device-compatible names. The list is sorted from best match to least favorable match. Input to this service is an array FileBasedDriverRecord elements. Applications can use ScanDriverCandidates to match drivers from a static list of candidates without having to incur the overhead of disk I/O operations.

| RESULT CODES | | |
|---|---|---|
| noErr | 0 | No error |
| fnfErr | −43 | File not found |
| All CFM errors | | |

FindDriversForDevice

FindDriversForDevice finds the driver from a file or from a device tree property that represents the "best" driver for a device—that is, the latest version of the most appropriate driver. The procedure for determining a best driver is described with reference to FIG. 11 of the present invention.

```
OSErr  FindDriversForDevice  (RegEntryIDPtr      device,
                              FSSpec             *fragment-
                                                 Spec,
                              Driver-            *file-
                              Description        Driver-
                                                 Desc,
                              Ptr                *memAddr,
                              long               *length,
                              StringPtr          fragName,
                              Driver-            *mem-
                              Description        Driver-
                                                 Desc);
   device           device ID
   fragmentSpec     pointer to a file system specification
   fileDriverDesc   pointer to the Driver Description of
                    driver in a file
   memAddr          pointer to driver address
   length           length of driver code
   fragName         name of driver fragment
   memDriverDesc    pointer to the Driver Description of
                    driver in memory
```

Given a pointer to the RegEntryID value of a device, FindDriversForDevice finds the most suitable driver for that device. If the driver is located in a file, it returns a pointer to the driver's CFM file system specification in fragmentSpec and a pointer to its Driver Description in fileDriverDesc. If the driver is a fragment located in memory, FindDriversForDevice returns a pointer to its address in memAddr, its length in length, its name in fragName, and a pointer to its Driver Description in memDriverDesc. FindDriversForDevice initializes all outputs to nil before searching for drivers.

| RESULT CODES | | |
|---|---|---|
| noErr | 0 | No error |
| fnfErr | −43 | File not found |
| All CFM errors | | |

GetDriverForDevice

GetDriverForDevice loads the "best" driver for a device from memory. The procedure for determining the best driver for a selected device is described in with reference to FIG. 11.

```
OSErr  GetDriverForDevice  (RegEntryIDPtr       device,
                            ConnectionID        *fragment-
                                                ConnID,
                            DriverEntryPoint-   *fragment-
                            Ptr                 Main
                            Driver-             *driverDesc);
                            DescriptionPtr
   device          device ID
   fragmentConnID  pointer to a fragment connection ID
```

| | |
|---|---|
| fragmentMain | pointer to DoDriverIO |
| driverDesc | pointer to the Driver Description of driver |

Given a pointer to the RegEntryID value of a device, GetDriverForDevice loads from memory the most suitable driver for that device. It returns the loaded driver's CFM connectionID value in fragmentConnID, a pointer to its DoDriverIO entry point in fragmentMain, and a pointer to its Driver Description.

| RESULT CODES | | |
|---|---|---|
| noErr | 0 | No error |
| fnfErr | −43 | File not found |
| All CFM errors | | |

SetDriverClosureMemory

```
OSErr SetDriverClosureMemory
         (CFragConnectionID       fragmentConnID,
          Boolean                 holdDriverMemory);
   fragmentConnID    ID of driver closure (returned from other
                     DLL loading services)
   holdDriverMemory  true to hold the memory of a driver closure;
                     false to unhold.
```

In one embodiment, a driver 80 and all its libraries is called a driver closure. When a driver 80 is loaded and prepared for initialization by the DLL, memory for its closure may be held as the final step in implementing GetDriverMemoryFragment and GetDriverDiskFragment. SetDriverClosureMemory lets one do this by setting the holdDriverMemory parameter true. SetDriverClosureMemory can also be use to free memory held for a driver closure by setting the holdDriverMemory parameter false. To undo the effects of GetDriverMemoryFragment or GetDriverDiskFragment, an I/O expert can call SetDriverMemoryClosureMemory (cfmID, false) followed by CloseConnection (&cfmID). This has the effect of unloading the driver. Listing below shows a sample procedure to perform this task.

```
void UnloadTheDriver (CFragConnectionID fragID)
{
    OSErr     Status;
    THz       theCurrentZone      =GetZone ( );
    // Make sure the fragment is attached to the system
    // context (System 7.5.2 CFM keys context from the
    // current heap zone)
    SetZone (SystemZone ( ));
    Status = SetDriverClosureMemory (fragID), false);
    if (Status != noErr)
        printf ("Couldn't unhold pages of Driver Closure!
                (Err=%x) \n",Status);
    Status=CloseConnection (&fragID);
    if (Status != noErr)
        printf ("Couldn't close Driver Connection!
                (Err=%x) \n", Status);
    //Reset the zone
    SetZone (theCurrentZone);
}
```

Installation

Once loaded, a driver must be installed in a Unit Table (stored in memory) to become available to Device Manager clients ("applications"). This process begins with a CFM fragment connection ID and results in a refNum. The installing software can specify a desired range of unit numbers in the Unit Table. For example, SCSI drivers use the range 32 to 38 as a convention to their clients. If the driver cannot be installed within that range, an error is returned. The Unit Table grows to accommodate the new driver as well.

In one embodiment, the unit table may grow only if the unit number is between some defined number (for example 48) and the current highest unit number as returned by the HighestUnitNumber procedure. When installing a native driver, the caller also passes the RegEntryIDPtr of the device which the driver is to manage. This pointer (along with the refNum) is given to the driver as a parameter in the initialization command. The driver may use this pointer to iterate through a device's property list, as an aid to initialization. The native driver should return noErr to indicate a successful initialization command. These functions, described in the below, operate on a loaded driver fragment: (1) verifyFragmentAsDriver verifies fragment contents as driver; (2) InstallDriverFromFragment places a driver fragment in the Unit Table; (3) InstallDriverFromDisk places a disk-based driver in the Unit Table; and (4) OpenInstalledDriver opens a driver that is already installed in the Unit Table VerifyFragmentAsDriver VerifyFragmentAsDriver guarantees that there is a driver in a given fragment.

```
OSErr VerifyFragmentAsDriver
        (ConnectionID              fragmentConnID,
        NuDriverEntryPointPtr      *fragmentMain,
        DriverDescriptionPtr       *driverDesc);
fragmentConnID    CFM connectionID
fragmentMain      resulting pointer to DoDriverIO
driverDesc        resulting pointer to DriverDescription
```

Given a CFM connectionID value for a code fragment, VerifyFragmentAsDriver verifies that the fragment is a driver. It returns a pointer to the driver's DoDriverIO entry point in fragmentMain and a pointer to its Driver Description in driverDesc.

RESULT CODES

| noErr | 0 | No error |
|---|---|---|
| All CFM errors | | |

InstallDriverFromFragment

InstallDriverFromFragment installs a driver fragment in the Unit Table.

```
OSErr InstallDriverFromFragment
        (ConnectionID              fragmentConnID,
        RegEntryIDPtr              device,
        UnitNumber                 beginningUnit,
        UnitNumber                 endingUnit,
        refNum                     *refNum);
fragmentConnID    CFM connectionID
device            pointer to Name Registry specification
beginningUnit     low unit number in Unit Table range
endingUnit        high unit number in Unit Table range
refNum            resulting Unit Table refNum
```

InstallDriverFromFragment installs a driver that is located in a CFM code fragment, using the standard code fragment search path, anywhere within the specified unit number range of the Unit Table. It invokes the driver's Initialize command, passing the RegEntryIDPtr to it. The driver's initialization code must return noErr for InstallDriverFromFragment to complete successfully. This function returns the driver's refNum but it does not open the driver. If the requested Unit Table range is from the determined number (e.g., 48) to the highest unit number currently available, as returned by the HighestUnitNumber procedure, and if that range is currently filled, the Unit Table will expand to accept the new driver. If the Device Manager 90 has already enlarged the Unit Table to its maximum possible size, however, InstallDriverFromFragment will return unitTblFullErr.

RESULT CODES

| noErr | 0 | No error |
|---|---|---|
| badUnitErr | −21 | Bad unit number |
| unitTblFullErr | −29 | Unit table or requested range full |
| Specific returns Initialize, Replace, Superseded | | |
| All CFM errors | | |

InstallDriverFromDisk

InstallDriverFromDisk locates a file in the Extensions folder that is in the Mac OS System folder, verifies that the file's contents are a native driver, and loads and installs the driver.

```
OSErr InstallDriverFromDisk
        (Ptr                       driverName,
        RegEntryIDPtr              device,
        UnitNumber                 beginningUnit,
        UnitNumber                 endingUnit,
        DriverRefNum               *refNum);
driverName        Name of a disk file containing a driver
device            Pointer to entry in the Name Registry
beginningUnit     First Unit Table number of range acceptable for
                  installation
endingUnit        Last Unit Table number of range acceptable for
                  installation
refNum            Reference number returned by InstallDriverFromDisk
```

InstallDriverFromDisk installs a driver that is located on disk 104 anywhere within the specified unit number range of the Unit Table and invokes the driver's Initialize command, passing the RegEntryIDPtr to it. The driver's initialization code must return noErr for InstallDriverFromDisk to complete successfully. This function returns the driver's refNum but it does not open the driver. If the requested Unit Table range is from the determined number (e.g., 48) to the highest unit number currently available, as returned by the HighesTUnitNumber procedure, and if that range is currently filled, the Unit Table will expand to accept the new driver. If the Device Manager 90 has already enlarged the Unit Table to its maximum possible size, however, InstallDriverFromDisk will return unitTblFullErr.

RESULT CODES

| noErr | 0 | No error |
|---|---|---|
| fnfErr | −43 | File not found |
| badUnitErr | −21 | Bad unit number |
| unitTblFullErr | −29 | Unit table or requested range full |
| All CFM errors | | |

OpenInstalledDriver

OpenInstalledDriver opens a driver that is already installed in the Unit Table.

```
OSErr OpenInstalledDriver
       (DriverRefNum    refNum,
        SInt8           ioPermission);
refNum          Unit Table reference number
ioPermission    I/O permission code:
                fsCurPerm    0 retain current permission
                fsRdPerm     1 allow read actions only
                fsWrPerm     2 allow write actions only
                fsRdWrPerm   3 allow both read and write actions
```

Given an installed driver's Unit Table reference number, OpenInstalledDriver opens the driver. The Device Manager 90 ignores the ioPermission parameter; it is included only to provide easy communication with the driver.

RESULT CODES

| noErr | 0 | No error |
|---|---|---|
| badUnitErr | −21 | Bad unit number |
| unitEmptyErr | −22 | Empty unit number |

Load and Install Option

Callers wishing to combine the loading and installation process in one service may want to use one of the following functions, described in the next sections: (1) InstallDriverFromFile loads and installs a file-based driver, and (2) InstallDriverFromMemory loads and installs a memory-based driver InstallDriverFromFile InstallDriverFromFile loads a driver from a file and installs it.

```
OSErr InstallDriverFromFile    (FSSpecPtr        fragmentSpec,
                                RegEntryIDPtr    device,
                                UnitNumber       beginningUnit,
                                UnitNumber       endingUnit,
                                refNum           *refNum);
    fragmentSpec    pointer to a file system specification
    device          pointer to Name Registry Specification
    beginningUnit   low unit number in Unit Table Range
    endingUnit      high unit number in Unit Table Range
    refNum          resulting Unit Table refNum
```

InstallDriverFromFile installs a driver that is located on disk 104 anywhere within the specified unit number range of the Unit Table and invokes the driver's Initialize command, passing the RegEntryIDPtr to it. The driver's initialization code must return noErr for InstallDriverFromFile to complete successfully. This function returns the driver's refNum but it does not open the driver. If the requested Unit Table range is from the determined number (e.g., 48) to the highest unit number currently available, as returned by the HighestUnitNumber procedure, and if that range is currently filled, the Unit Table will expand to accept the new driver. If the Device Manager has already enlarged the Unit Table to its maximum possible size, however, InstallDriverFromFile will return unitTblFullErr.

RESULT CODES

| noErr | 0 | No error |
|---|---|---|
| fnfErr | −43 | File not found |
| badUnitErr | −21 | Bad unit number |
| unitTblFullErr | −29 | Unit table or requested range full |
| All CFM errors | | |

InstallDriverFromMemory

InstallDriverFromMemory loads a driver from a range of memory and installs it.

```
OSErr InstallDriverFromMemory
                       (Ptr             memory,
                        long            length,
                        Str63           fragName,
                        RegEntryIDPtr   device,
                        UnitNumber      beginningUnit,
                        UnitNumber      endingUnit,
                        refNum          *refNum);
    memory          pointer to beginning of fragment in memory
    length          length of fragment in memory
    fragName        An optional name of the fragment (primarily used
                    by debugger)
    device          pointer to Name Registry specification
    beginningUnit   low unit number in Unit Table range
    endingUnit      high unit number in Unit Table range
    refNum          resulting Unit Table refNum
```

InstallDriverFromMemory installs a driver that is located in a CFM code fragment, using the standard code fragment search path, anywhere within the specified unit number range of the Unit Table. It invokes the driver's Initialize command, passing the RegEntryIDPtr to it. The driver's initialization code must return noErr for InstallDriverFromMemory to complete successfully. This function returns the driver's refNum but it does not open the driver. If the requested Unit Table range is from the determined number (e.g., 48) to the highest unit number currently available, as returned by the HighestUnitNumber procedure, and if that range is currently filled, the Unit Table will expand to accept the new driver. If the Device Manager has already enlarged the Unit Table to its maximum possible size, however, InstallDriverFromMemory will return unitTblFullErr.

RESULT CODES

| noErr | 0 | No error |
|---|---|---|
| badUnitErr | −21 | Bad unit number |
| unitTblFullErr | −29 | Unit table or requested range full |
| All CFM errors | | |

Match, Load and Install

Those wishing to combine the matching of the best driver for a device, with the loading and installation process in one service, may use InstallDriverForDevice and HigherDriverVersion, described in this section. The DriverDescription data structure is used to compare a driver's functionality with a device's needs as discussed above. The Driver Loader Library picks the best driver for the device by looking for drivers in the Extensions folder (device driver folder) and comparing those against drivers in the device's property list.

InstallDriverForDevice

InstallDriverForDevice installs the "best" driver for a device. The procedure for determining the best driver is described in FIG. 11.

```
OSErr InstallDriverForDevice
                       (RegEntryIDPtr   device,
                        UnitNumber      beginningUnit,
                        UnitNumber      endingUnit,
                        refNum          *refNum);
    device          pointer to Name Registry specification
    beginningUnit   low unit number in Unit Table range
    endingUnit      high unit number in Unit Table range
    refNum          resulting Unit Table refNum
```

InstallDriverForDevice finds, loads, and installs the best driver for a device identified by its RegEntryID value. In one embodiment, it installs the driver anywhere within the specified unit number range of the Unit Table and invokes its Initialize command, passing the RegEntryIDPtr to it. The driver's initialization code must return noErr for InstallDriverForDevice to complete successfully. This function returns the driver's refNum but it does not open the driver. If the requested Unit Table range is from the determined number (e.g., 48) to the highest unit number currently available, as returned by the HighestUnitNumber procedure, and if that range is currently filled, the Unit Table will expand to accept the new driver. If the Device Manager 90 has already enlarged the Unit Table to its maximum possible size, however, InstallDriverForDevice will return unitTblFullErr.

RESULT CODES

| noErr | 0 | No error |
|---|---|---|
| fnf Err | -43 | File not found |
| badUnitErr | -21 | Bad unit number |
| unitTblFullErr | -29 | Unit table or requested range full |
| All CFM errors | | |

HigherDriverVersion

HigherDriverVersion compares two driver version numbers, normally the values in their DriverDescription structures. It returns a value that indicates which driver is later. This service may be used by any software that loads or evaluates drivers.

| short | HigherDriverVersion | (NumVersion *V1,NumVersion *V2); |
|---|---|---|
| struct NumVersion { | | |
| | UInt8 majorRev; | /*1st part of version*/ /*number in BCD*/ |
| | UInt8 minorAndBugRev; | /*2nd and 3rd part of*/ /*version number share a*/ /*byte*/ |
| | UInt8 stage; | /*stage code: dev, alpha,*/ /*beta, final*/ |
| | UInt8 nonRelRev; | /*rev level of non-*/ /*released version*/ |
| }; | | |
| V1 | First version number being compared | |
| V2 | Second version number being compared | |

HigherDriverVersion returns 0 if v1 and v2 are equal. It returns a negative number if Vl<V2 and a positive number greater than 0 if V1>V2. If both drivers have stage values of final, a nonRelRev value of 0 is evaluated as greater than any nonzero number.
Stage codes are the following:
  developStage=0×20
  alphaStage=0×40
  betaStage=0×60
  finalStage=0×80
Driver Removal Applications wishing to remove an installed driver can use RemoveDriver, see block 240 of FIG. 7.
RemoveDriver
RemoveDriver removes an installed driver.

| OSErr | RemoveDriver | (refNum refNum, Boolean Immediate); |
|---|---|---|
| refNum | refNum of driver to remove | |
| Immediate | true means don't wait for driver to become idle | |

RemoveDriver accepts a refNum and unloads a code fragment driver from the Unit Table. It invokes the driver's Finalize command. If called as immediate, it does not wait for driver to become inactive.

RESULT CODES

| noErr | 0 | No error |
|---|---|---|
| badUnitErr | -21 | Bad unit number |
| unitEmptyErr | -22 | Empty unit number |

Getting Driver Information

Applications wishing to acquire information about an installed driver can use GetDriverInformation.

GetDriverInformation

GetDriverInformation returns a number of pieces of information about an installed driver, see block 220 of FIG. 7.

| OSErr | GetDriverInformation | |
|---|---|---|
| | (DriverRefNum | refNum, |
| | UnitNumber | *unitNum, |
| | DriverFlags | *flags, |
| | DriverOpenCount | *count, |
| | StringPtr | name, |
| | RegEntryID | *device, |
| | CFragHFSLocator | *driverLoadLocation, |
| | CFragConnectionID | * fragmentConnID, |
| | DriverEntryPointPtr | *fragmentMain, |
| | DriverDescription | *driverDesc); |
| refNum | refNum of driver to examine | |
| unit | resulting unit number | |
| flags | resulting DCE flag bits | |
| count | number of times driver has been opened | |
| name | resulting driver name | |
| device | resulting Name Registry device specification | |
| driverLocation | resulting CFM fragment locator (from which the driver was loaded) | |
| fragmentConnID | resulting CFM connection ID | |
| fragmentMain | resulting pointer to DoDriverIO | |
| driverDesc | resulting pointer to DriverDescription | |

Given the Unit Table reference number of an installed driver, GetDriverInformation returns the driver's unit number in unit, its DCE flags in flags, the number of times it has been opened in count, its name in name, its RegEntryID value in device, its CFM fragment locator in driverLocation, its CFM connection 112) infragmentConnID, its DoDriverIO entry point in fragmentMain, and its Driver Description in driverDesc.

RESULT CODES

| noErr | 0 | No error |
|---|---|---|
| badUnitErr | -21 | Bad unit number |
| unitEmptyErr | -22 | Empty unit number |

Searching For Drivers

The exemplary procedures described in this section help clients iterate through the Unit Table, locating installed drivers.

HighestUnitNumber

HighestUnitNumber returns the currently highest valid unit number in the Unit Table. UnitNumber HighestUnitNumber (void);

HighestUnitNumber takes no parameters. It returns a UnitNumber value that represents the highest unit number in the Unit Table.

LookupDrivers

LookupDrivers is used to iterate through the contents of the Unit Table.

| | | |
|---|---|---|
| OSErr LookupDrivers | (UnitNumber | beginningUnit, |
| | UnitNumber | endingUnit, |
| | Boolean | emptyUnits, |
| | ItemCount | *returnedRefNums, |
| | DriverRefNum | *refNums); |
| beginningUnit | First unit in range of units to scan | |
| endingUnit | Last unit in range of units to scan | |
| emptyUnits | true: return available units | |
| | false: return allocated units | |
| returnedRefNums | Maximum number of reference numbers to return; on completion, contains actual number of refNums returned | |
| refNums | resulting array of returned refNums | |

Given the first and last unit numbers to scan, LookupDrivers returns the reference numbers of both native and 68K drivers. The emptyUnits parameter tells it to return either available or allocated units and returnedRefNums tells it the maximum number of reference numbers to return. When LookupDrivers finishes, returnedRefNums contains the actual number of refNums returned. The sample code shown below uses HighestUnitNumber and LookupDrivers to print out the reference numbers of all installed drivers and obtain driver information.

RESULT CODES

| | | |
|---|---|---|
| noErr | 0 | No error |
| paramErr | -50 | Bad parameter |

```
FindAllDrivers( )
{
    ItemCount      theCount       = 1;
    UnitNumber     theUnit        = 0;
    DriverRefNum   theRefNum,     *fullSizedRefNumBuffer;
    //Method #1:   Iterate with a small output buffer
    while ( (theUnit <= HighestUnitNumber( ) ) &&
        (LookupDrivers (theUnit, theUnit, false, &theCount,
        &theRefNum) == noErr)
    {
        if (theCount == 1) printf ("Refnum;#%d is
        allocated. \n", theRefNum);
        theCount = 1;
        theUnit++;
    }
    // Method #2: Get all refnums with one call
    fullSizedRefNumBuffer = NewPtr
    ((HighestUnitNumber( ) + 1) *
        sizeof(DriverRefNum));
    theCount = (HighestUnitNumber( ) + 1);
    LookupDrivers (0, HighestUnitNumber( ), false, &theCount,
    fullSizedRefNumBuffer);
        for(theUnit=0,theUnit < theCount;theUnit++)
    {
        printf("Refnum #%d is allocated.\n",
        fullSizedRefNumBuffer [theUnit]);
        ShowDriverInfo (fullSizedRefNumBuffer [theUnit]);
    }
    DisPosePtr(fullSizedRefNumBuffer);
    return noErr,
}
ShowDriverInfo (DriverRefNum *refNum)
{
    UnitNumber          theUnit;
    DriverRefNum        aRefNum;
    DriverFlags         theFlags;
    FSSpec              driverFileSpec;
    RegEntryID          theDevice;
    CFragHFSLocator     theLoc;
    Str255              theName;
    CFragConnectionID   fragmentConnID;
    DriverOpenCount     theOpenCount
    DriverEntryPointPtr fragmentMain;
    DriverDescription   theDriverDescription;
    theLookuponDisk.fileSpec = &driverFileSpec;
    GetDriverInformation  ( aRefNum,
```

RESULT CODES

```
                            &theUnit,
                            &theFlags,
                            &theOpenCount, theName,
                            &theDevice,
                            &theLoc,
                            &fragmentConnID,
                            &fragmentMain,
                            &theDriverDescription);
    printf("Driver's flags are: %x\n", theFlags);
```

Finding, Initializing, and Replacing Drivers

The native driver framework tolerate a wide range of variations in system configuration. Although drivers and expansion cards may be designed and updated independently, the system autoconfiguration firmware offers several techniques for making them work together. This section discusses what PCI driver and card designers can do to improve the compatibility of their products.

Device Properties

A PCI device is required to provide a set of properties in its PCI configuration space. These properties can be used in the device tree 10 database for a particular device. It may optionally supply FCode and runtime driver code in its expansion ROM. PCI devices without FCode and runtime driver code in ROM may not be used during system startup. The required device properties in PCI configuration space are: (1) vendor-ID; (2) device-ID; (3) class-code; and (4) revision-number. For PCI boot devices there must be an additional property: driver-reg, AAPL, MacOS, PowerPC. This property contains a pointer to the boot driver's image in the PCI card's expansion ROM. It is used in conjunction with the f code-rom-of f set property. The OpenFirmware FCode in a PCI device's expansion ROM (e.g., ROM 103) must provide and install a driver-reg property, as shown above, to have its driver appear in the Name Registry and be useful to the system during startup. It must also add its expansion ROM's base register to the reg property, so that system firmware can allocate address space when installing the driver.

Boot Sequence

The following is a short description of a boot sequence (e.g., for PCI standard): 1. Hardware reset. 2. Open Firmware creates the device tree. This device tree is composed of all the devices found by the Open Firmware code including all properties associated with those devices. 3. The Name Registry device tree is created by copying the Macintosh-relevant nodes and properties from the Open Firmware device tree. 4. The Code Fragment Manager and the Interrupt Tree are initialized. 5. Device properties that are persistant across system startups and are located in NVRAM are restored to their proper location in the Name Registry device tree. 6. The Name Registry device tree is searched for PCI expansion ROM device drivers associated with device nodes. 7. PCI expansion ROM device drivers required for booting are loaded and initialized. 8. If a PCI ROM device driver is marked as kdriverIsLoadedUponDiscovery, the driver is installed in the Device Manager Unit Table. 9. If a PCI ROM device driver is marked as kdriverIsOpenedUponLoad, the driver is initialized and opened, and the driver-ref property is created for the driver's device node. 10. The Display Manager is irritated. 11. The SCSI Manager is initiated. 12. The File Manager and Resource Manager are initialized. 13. Device properties that are persistent across system startups and located in the folder System Folder: Preferences are restored to their proper location in the Name Registry device tree.

Device drivers that fall under Family Expert control are processed next. The following steps load disk-based experts and disk-based drivers: 1. Scan the extensions folder for drivers, (file type 'ndrv'), updating the Registry with new versions of drivers as appropriate. For each driver added or updated in the tree, a driver-description property is added or updated as well. 2. For each driver that is replaced, and already open, use the driver replacement mechanism. 3. Run 'init' resources for virtual devices. 4. Scan the extensions folder for experts, (file type 'expt'); load, initialize, and run the expert. 5. Run experts to scan the registry, using the driver-description property associated with each node to determine which devices are of the appropriate family. 6. Load and initialize appropriate devices based on family characteristics. At that point all devices in use by the system and family subsystems are initialized. Uninitialized and unopened devices or services that may be used by client applications are located, initialized, and opened at the time that a client makes a request for the devices or services.

Matching Drivers With Devices

The matching logic of the present invention is presented above with respect to FIG. 8–FIG. 11. In one exemplary embodiment, the DLL 45 procedures GetDriverForDevice, InstallDriverForDevice, and FindDriversForDevice use the following procedure to match or install the "best" driver for a device under the present invention: 1. Find all candidate drivers for the device to build a candidate list. A driver 80 is a candidate if its nameInfoStr value 80c matches either the device's name 50 or one of the names 60a found in the device's compatible property. 2. Sort this list based on whether the driver 80 matched using the device's name 50 or a compatible name 60a. Those matched with the device name 50 are put at the head of the candidate list. Tie are broke using the driver's version number information. 3. If not installing the driver, return the driver at the head of the candidate list and go to step 7 below. 4. While there are candidates with which to attempt an installation, do the following steps: 5. Load and install the driver located at the head of the candidate list. 6. The driver should probe the device, using DSL services, to verify the match. If the driver did not successfully initialize itself report error. 7. Discard any remaining candidates.

DeviceProbe

DeviceProbe is used to determine if a hardware device is present at the indicated address. This process can operate during block 530 of FIG. 11.

| OSStatus | DeviceProbe | (void | *theSrc, |
|---|---|---|---|
| | | void | *theDest, |
| | | UInt32 AccessType); | |
| theSrc | The address of the device to be accessed | | |
| theDest | The destination of the contents of theSrc | | |
| AccessType | How theSrc is to be accessed: | | |
| | k8BitAccess | | |
| | k16BitAccess, | | |
| | k32BitAccess | | |

DeviceProbe accesses the indicated address and stores the contents at theDest using AccessType to determine whether it should be an 8-bit, 16-bit or 32-bit access. Upon success it returns noErr. If the device is not present, e.g., if a bus error or a machine check is generated, it returns noHardwareErr. If a device such as a PCI card contains no FCode, and therefore is assigned a generic name of the form pcixxxx, yyyy, it is important for a driver to provide diagnostic code in its Initialize procedure. When a driver is matched with a card that has a genetic name property, it may be the wrong driver. In that case, diagnostic code probing for a unique characteristic of the card may not only fail a data compare, but can cause a possible unrecoverable machine check exception. DeviceProbe allows a driver to explore its hardware in a recoverable manner. It provides a safe read operation, which can gracefully recover from a machine check and return an error to the caller. If DeviceProbe fails, the driver should return an error from its Initialize command. This return may cause the DLL 45 to continue its driver-to-device matching process until a suitable driver is found.

| RESULT CODES | | |
|---|---|---|
| noErr | 0 | Device present |
| noHardwareErr | | Device not present |

Opening Devices

There is a distinction between device initialization and device opening. A device opening action is a connection-oriented response to client requests Device drivers should expect to run with multiple Open and Close commands. This means that each driver is responsible for counting open requests from clients, and must not close itself until all clients have issued close requests. Initialization can occur independently of client requests; for example at startup time, or (in the case of PCMCIA devices), when a device is hot-swapped into or out of the system. Initialization of native device driver controlled devices is handled in phases as described in the previous section. It is necessary to make a distinction here between PCI drivers and 68K drivers because the 68K driver initialization path has not changed.

In one embodiment, the first phase of native driver initialization consists of searching the device portion of the Name Registry looking for boot devices. Boot device nodes should be flagged as kdriverIsOpenedUponLoad in the DriverDescriptor property associated with the device node. These devices are loaded, initialized, and opened by the system. These drivers must be in ROM 103 and must be of service category 'ndrv'. Drivers should be passive code controlled by a client—in this case, the system starting up. PCI bridges are tagged kDriverIsLoadedUponDiscovery and kDriverIsOpenedUponLoad.

In one embodiment, the second phase of startup comes after the file system is available. In this second phase the device driver folder (e.g., extensions folder) is scanned for Family Experts, which are run as they are located. Their job is to locate and initialize all devices of their particular service category in the Name Registry 10. The Family experts are initialized and run before their service category devices are initialized because the Family expert extends the system facilities to provide services to their service category devices. For example, the DisplayManager extends the system to provide VBL capabilities to 'disp' service category drivers. In the past, VBL services have been provided by the Slot Manager; but with native drivers, family-specific services such as VBL services move from being a part of bus software to being a part of family software.

Driver Replacement

This section describes the mechanism to allow update of a ROM-based driver with an newer disk-based version. After the Registry is populated with device nodes, the startup sequence initializes the devices. For every device node in the Registry there are two questions that require answers before the system can complete a client request to use the device. The client may be the system itself or an application. The questions are: (1) Is there a driver for this node? (2) Where is the most current version of the driver for this node?

If there is a driver in ROM 103 for a device, the driver, AAPL, MacOS, PowerPC property is available in the Name Registry 10 whenever a client request is made to use that device. However, after the operating system is running and the file system is available, the ROM driver may not be the driver of choice. In this case, the ROM-based driver is replaced with a newer version of the driver on disk. In the system startup sequence, as soon as the file system 104 is available the operating system 30 searches the device driver folder (e.g., Extensions folder) and matches drivers in that folder with device nodes in the Name Registry. The driver-InfoStr and version fields of the DriverType field of the two DriverDescriptors 80a are compared, and the newer version of the driver is installed in the tree. When the driver is updated, the DriverDescriptor property and all other properties associated with the node whose names begin with Driver are updated in the Name Registry 10.

If the driver associated with a node is open (that is, if it was used in the system startup sequence) and if the driver is to be replaced, the system must first close the open driver, using the driver-ref property in the Name Registry 10 to locate it. The system must then update the Registry and reinstall and reopen the driver. If the close or finalize action fails, the driver will not be replaced. The native driver model does not provide automatic replacement of 68K drivers (type 'DRVR'). If an application needs to replace a 68K driver with a native driver dynamically, the open 68K driver is closed and its state information is extracted, and load and install the native driver using the Driver Loader Library. The native driver will occupy the same DCE slot as the 68K driver and use the same refNum. After being opened, it will start running with the state information that was extracted from the 68K driver.

Applications and other software can use the ReplaceDriverWithFragment function to replace one driver with another and RenameDriver to change a driver's name. These procedures are described next.

ReplaceDriverWithFragment

ReplaceDriverWithFragment replaces a driver that is already installed with a new driver contained in a CFM fragment. It sends replace and superseded calls to the drivers.

| OSErr ReplaceDriverWithFragment | (DriverRefNum theRefNum, ConnectionID fragmentConnID); |
|---|---|
| theRefNum | Reference number of the driver to be replaced |
| fragment ConnID | CFM connection ID for the new driver fragment |

Given the Unit Table reference number of an installed driver in theRefNum, ReplaceDriverWithFragment replaces that driver with a new driver contained in a CFM fragment identified by fragmentConnID. It sends replace and superseded calls to both drivers.

RESULT CODES

| noErr | 0 | No error |
|---|---|---|
| All CFM errors | | |

RenameDriver

RenameDriver changes the name of a driver.

| OSErr RenameDriver | (DriverRefNum theRefNum, StringPtr name); |
|---|---|
| theRefNum | Reference number of the driver to be renamed |
| name | Pointer to the driver's new name |

Given the Unit Table reference number of an installed driver in theRefNum, RenameDriver changes the driver's name to the contents of a string pointed to by name.

RESULT CODES

| noErr | 0 | No error |
|---|---|---|
| badUnitErr | −21 | Bad unit number |
| unitEmptyErr | −22 | Empty unit number |

The preferred embodiment of the present invention, a mechanism and method for automatically determining a driver for a selected device using candidate lists and sequentially applying drivers of these candidate list to the device for match, is thus described. While the present invention has been described in particular embodiments, it should be appreciated that the present invention should not be construed as limited by such embodiments, but rather construed according to the below claims.

What is claimed is:

1. In a computer system having a processor coupled to a communication bus, a memory unit coupled to said communication bus, and devices coupled to said communication bus, a method for configuring a particular device of said devices with a device driver, said method comprising the computer implemented steps of:

determining a device name associated with said particular device;

determining at least one compatible device name associated with said particular device, said at least one compatible device name indicating a device compatible with said particular device;

scanning a first set of available drivers within said computer system to determine a second set of drivers individually having a driver name that matches with either said device name or said at least one compatible device name;

sequentially attempting installation of individual drivers of said second set of drivers with said particular device to determine a matching driver of said second set of drivers that properly configures said particular device; and determining said matching driver of said set of drivers that properly configures said particular device.

2. A method as described in claim 1 further comprising the computer implemented step of sorting said second set of drivers by a priority of compatibility with said particular device and wherein said step of sorting comprises the further computer implemented steps of:

sorting said second set of drivers such that an individual driver matching with said device name is given higher priority over an individual driver matching with said at least one compatible device name; and sorting said second set of drivers according to driver version information.

3. A method as described in claim 1 wherein said step of sequentially attempting installation comprises the computer implemented steps of:

probing said particular device with a particular driver of said second set of drivers;

performing a diagnostic test with respect to said particular driver and said particular device; and determining a status indicating whether or not said particular driver and said particular device are compatible.

4. A method as described in claim 1 wherein said first two steps of determining comprise the computer implemented steps of:

accessing information derived from a device tree database containing information regarding said devices of said computer system;

selecting said particular device from among said devices; and accessing said device name and said at least one compatible device name associated with said particular device from said information derived from said device tree database.

5. A method as described in claim 1 further comprising the computer implemented step of installing said matching driver with said particular device provided resources are available within said computer system required for operation of said particular device.

6. A method as described in claim 1 further comprising the computer implemented steps of:

scanning a third set of available drivers within said computer system to determine a fourth set of drivers individually having a driver name that matches with either said device name or said at least one compatible device name, said third set being more current over said first set of available drivers.

7. A method as described in claim 6 further comprising the computer implemented steps of:

sequentially attempting installation of individual drivers of said fourth set of drivers with said particular device to determine another matching driver of said fourth set of drivers that properly configures said particular device, said another matching driver being more compatible with said device compared to said matching driver; and determining said another matching driver upon an indication by said step of sequentially attempting installation of individual drivers of said fourth set of drivers.

8. In a computer system having a processor coupled to a communication bus, a memory unit coupled to said communication bus, and devices coupled to said communication bus, a method for configuring a particular device of said devices, said method comprising the computer implemented steps of:

determining a set of device names associated with said particular device;

scanning a first set of available drivers within said computer system to determine a second set of drivers individually having a driver name that matches with any name of said set of device names;

sorting said second set of drivers by a priority of compatibility with said particular device;

sequentially attempting installation of individual drivers of said second set of drivers with said particular device to determine a first matching driver of said second set of drivers that properly configures said particular device; and installing said first matching driver with said particular device.

9. A method as described in claim 8 wherein said a set of device names associated with said particular device comprises a device name of said particular device and a set of compatible device names indicating devices compatible with said particular device.

10. A method as described in claim 9 wherein said step of sorting said second set of drivers by a priority of compatibility with said particular device comprises the further computer implemented steps of:

sorting said second set of driven such that an individual driver matching with said device name is given higher priority over an individual driver matching with a compatible device name of said set of compatible device names; and sorting said second set of drivers according to driver version information.

11. A method as described in claim 9 wherein said step of determining comprises the further computer implemented steps of:

accessing information derived from a device tree database containing information regarding said devices of said computer system;

selecting said particular device from among said devices; and accessing said device name and said set of compatible device names associated with said particular device from said information derived from said device tree database.

12. A method as described in claim 9 further comprising the computer implemented steps of:

scanning a third set of available drivers within said computer system to determine a fourth set of drivers individually having a driver name that matches with either said device name or any name of said set of compatible device names, said fourth set larger than said second set; and sorting said fourth set of drivers by a priority of compatibility with said particular device.

13. A method as described in claim 12 further comprising the computer implemented steps of:

sequentially attempting installation of individual drivers of said fourth set of drivers with said particular device to determine a second matching driver of said fourth set of drivers that properly configures said particular device, said second matching driver being more compatible with said device over said first matching driver;

removing said first matching driver from said particular device; and installing said second matching driver with said particular device.

14. A method as described in claim 8 wherein said step of sequentially attempting installation comprises the computer implemented steps of:

probing said particular device with a particular driver of said second set of drivers;

performing a diagnostic test with respect to said particular driver and said particular device; and determining a status indicating whether or not said particular driver and said particular device are compatible.

15. A method as described in claim 8 further wherein said step of installing said first matching driver comprises the further computer implemented steps of:

determining that said computer system contains resources required by said particular device for proper operation; and installing said first matching driver with said particular device provided said resources required by said particular device are present within said computer system.

16. A computer system having a processor coupled to a communication bus, a memory unit coupled to said communication bus, devices coupled to said communication bus, and logic executed by said processor for configuring a particular device of said devices, said logic comprising:

first logic for determining a device name associated with said particular device;

second logic for determining at least one compatible device name associated with said particular device, said at least one compatible device name indicating a device compatible with said particular device;

logic for scanning a first set of available drivers within said computer system to determine a second set of drivers individually having a driver name that matches with either said device name or said at least one compatible device name, said logic for scanning coupled to said first and second logic;

logic for sequentially attempting installation of individual drivers of said second set of drivers with said particular device to determine a first matching driver of said second set of drivers that properly configures said particular device; and third logic for determining said first matching driver of said set of drivers that matches with said particular device, said third logic coupled to said logic for sequentially attempting installation.

17. A computer system as described in claim 16 further comprising logic for sorting said second set of drivers by a priority of compatibility with said particular device, said logic for sorting coupled to said logic for sequentially attempting installation and wherein said logic for sorting further comprises:

logic for sorting said second set of drivers such that an individual driver matching with said device name is given higher priority over an individual driver matching with said at least one compatible device name; and logic for sorting said second set of drivers according to driver version information.

18. A computer system as described in claim 16 wherein said logic for sequentially attempting installation comprises:

logic for probing said particular device with a particular driver of said second set of drivers;

logic for performing a diagnostic test between said particular driver and said particular device; and fourth logic for determining a status indicating whether or not said particular driver and said particular device are compatible, said fourth logic coupled to said logic for performing a diagnostic test.

19. A computer system as described in claim 16 further comprising logic for installing said first matching driver with said particular device.

20. A computer system as described in claim 19 further comprising:

logic for scanning a third set of available drivers within said computer system to determine a fourth set of drivers having a driver name that matches with either said device name or said at least one compatible device name, said fourth set being larger than said second set; and logic for sorting said fourth set of drivers by a priority of compatibility with said particular device.

21. A computer system as described in claim 20 further comprising:

logic for sequentially attempting installation of individual drivers of said fourth set of drivers with said particular device to determine a second matching driver of said fourth set of drivers that properly configures said particular device, said second matching driver being more compatible with said device over said first matching driver; and logic for removing said first matching driver from said particular device; and logic for installing said second matching driver with said particular device.

22. A computer system as described in claim 21 wherein said first set of drivers represents drivers recognized by said computer system at a first time and said third set of drivers represents drivers recognized by said computer system at a second, subsequent, time.

23. A computer system as described in claim 16 wherein said first and second logic comprises:

logic for accessing information derived from a device tree database containing information regarding said devices of said computer system;

logic for selecting said particular device from among said devices; and logic for accessing said device name and said at least one compatible device name associated with said particular device from said information derived from said device tree database.

* * * * *

UNITED STATES PATENT AND TRADEMARK OFFICE
CERTIFICATE OF CORRECTION

PATENT NO : 5,630,076

DATED : May 13, 1997

INVENTOR(S) : Saulpaugh, et al.

It is certified that error appears in the above-identified patent and that said Letters Patent are hereby corrected as shown below:

In the Claims:

Claim 10, column 40, line 8, delete "driven" and insert -- drivers- -.

Signed and Sealed this

Twenty-ninth Day of May, 2001

Attest:

NICHOLAS P. GODICI

*Attesting Officer*     *Acting Director of the United States Patent and Trademark Office*